(12) United States Patent
Corrao, Jr. et al.

(10) Patent No.: US 12,458,509 B2
(45) Date of Patent: Nov. 4, 2025

(54) VERTICALLY AND LATERALLY EXPANDABLE VERTEBRAL CAGE

(71) Applicant: SHANGHAI KINETIC MEDICAL CO., LTD., Shanghai (CN)

(72) Inventors: Ernest N. Corrao, Jr., Bethel, CT (US); Charles A. Wing, Milford, CT (US)

(73) Assignee: SHANGHAI KINETIC MEDICAL CO., LTD., Shanghai (CN)

( * ) Notice: Subject to any disclaimer, the term of this patent is extended or adjusted under 35 U.S.C. 154(b) by 243 days.

(21) Appl. No.: 17/904,962

(22) PCT Filed: Mar. 4, 2021

(86) PCT No.: PCT/US2021/070231
§ 371 (c)(1),
(2) Date: Aug. 25, 2022

(87) PCT Pub. No.: WO2021/179011
PCT Pub. Date: Sep. 10, 2021

(65) Prior Publication Data
US 2023/0190490 A1    Jun. 22, 2023

Related U.S. Application Data

(60) Provisional application No. 62/985,376, filed on Mar. 5, 2020.

(51) Int. Cl.
*A61F 2/44* (2006.01)
*A61F 2/30* (2006.01)

(52) U.S. Cl.
CPC .... *A61F 2/447* (2013.01); *A61F 2002/30383* (2013.01); *A61F 2002/30405* (2013.01);
(Continued)

(58) Field of Classification Search
CPC .......................................... A61F 2/4455–2/447
See application file for complete search history.

(56) References Cited

U.S. PATENT DOCUMENTS

| 6,443,989 B1 | 9/2002 | Jackson |
| 6,554,918 B2 | 4/2003 | Kashima et al. |

(Continued)

FOREIGN PATENT DOCUMENTS

| EP | 1290985 A2 | 3/2003 |
| EP | 1293180 A1 | 3/2003 |

(Continued)

OTHER PUBLICATIONS

International Search Report and Written Opinion dated Jun. 25, 2021 for PCT Application No. PCT/US2021/070231.

(Continued)

*Primary Examiner* — Julianna N Harvey
(74) *Attorney, Agent, or Firm* — Shore IP Group, PLLC; Sean R. Wilsusen

(57) ABSTRACT

An expandable vertebral device includes a base assembly having end portions that are movable relative to one another via adjustment of an adjustment mechanism at the first end portion. A plurality of movable plates are movably disposed at the base assembly and are at least vertically movable relative to the base assembly as the end portions are moved relative to one another. Each of the end portions has a pair of vertical guide elements and may have a pair of lateral guide elements. Each of the movable plates includes a vertical guide that moves along the respective vertical guide element and may have a lateral guide that moves along a respective lateral guide element. When the adjustment mechanism is adjusted to draw the end portions toward one (Continued)

another, the movable plates move outward from a longitudinal axis of the base assembly as the guides move along the respective guide elements.

28 Claims, 26 Drawing Sheets

(52) U.S. Cl.
CPC ............ *A61F 2002/3055* (2013.01); *A61F 2002/30556* (2013.01); *A61F 2002/30579* (2013.01)

(56) References Cited

U.S. PATENT DOCUMENTS

| | | | |
|---|---|---|---|
| 6,773,460 B2 | 8/2004 | Jackson |
| 6,835,206 B2 | 12/2004 | Jackson |
| 7,128,760 B2 | 10/2006 | Michelson |
| 7,211,112 B2 | 5/2007 | Baynham et al. |
| 7,214,243 B2 | 5/2007 | Taylor |
| 7,217,293 B2 | 5/2007 | Branch, Jr. |
| 7,410,501 B2 | 8/2008 | Michelson |
| 7,703,727 B2 | 4/2010 | Selness |
| 7,722,674 B1 | 5/2010 | Grotz |
| 7,819,921 B2 | 10/2010 | Grotz |
| 7,828,849 B2 | 11/2010 | Lim |
| 7,850,733 B2 | 12/2010 | Baynham et al. |
| 8,062,375 B2 | 11/2011 | Glerum et al. |
| 8,105,382 B2 | 1/2012 | Olmos et al. |
| 8,262,736 B2 | 9/2012 | Michelson |
| 8,273,129 B2 | 9/2012 | Baynham et al. |
| 8,317,866 B2 | 11/2012 | Palmatier et al. |
| 8,366,777 B2 | 2/2013 | Matthis et al. |
| 8,382,842 B2 | 2/2013 | Greenhalgh et al. |
| 8,398,713 B2 | 3/2013 | Weiman |
| 8,435,298 B2 | 5/2013 | Weiman |
| 8,506,635 B2 | 8/2013 | Palmatier et al. |
| 8,518,120 B2 | 8/2013 | Glerum et al. |
| 8,535,380 B2 | 9/2013 | Greenhalgh et al. |
| 8,556,979 B2 | 10/2013 | Glerum et al. |
| 8,568,481 B2 | 10/2013 | Olmos et al. |
| 8,579,981 B2 | 11/2013 | Lim et al. |
| 8,628,578 B2 | 1/2014 | Miller et al. |
| 8,632,595 B2 | 1/2014 | Weiman |
| 8,679,183 B2 | 3/2014 | Glerum et al. |
| 8,685,098 B2 | 4/2014 | Glerum et al. |
| 8,702,798 B2 | 4/2014 | Matthis et al. |
| 8,795,366 B2 | 8/2014 | Varela |
| 8,845,731 B2 | 9/2014 | Weiman |
| 8,845,734 B2 | 9/2014 | Weiman |
| 8,864,833 B2 | 10/2014 | Glerum et al. |
| 8,888,853 B2 | 11/2014 | Glerum et al. |
| 8,894,711 B2 | 11/2014 | Varela |
| 8,894,712 B2 | 11/2014 | Varela |
| 8,926,704 B2 | 1/2015 | Glerum et al. |
| 8,940,048 B2 | 1/2015 | Butler et al. |
| 8,986,389 B2 | 3/2015 | Lim et al. |
| 9,034,041 B2 | 5/2015 | Wolters et al. |
| 9,034,045 B2 | 5/2015 | Davenport et al. |
| 9,060,876 B1 | 6/2015 | To et al. |
| 9,119,730 B2 | 9/2015 | Glerum et al. |
| 9,149,367 B2 | 10/2015 | Davenport et al. |
| 9,204,972 B2 | 12/2015 | Weiman et al. |
| 9,204,974 B2 | 12/2015 | Glerum et al. |
| 9,211,196 B2 | 12/2015 | Glerum et al. |
| 9,216,095 B2 | 12/2015 | Glerum et al. |
| 9,233,007 B2 | 1/2016 | Sungarian et al. |
| 9,233,009 B2 | 1/2016 | Gray et al. |
| 9,271,846 B2 | 3/2016 | Lim et al. |
| 9,314,348 B2 | 4/2016 | Emstad |
| 9,320,610 B2 | 4/2016 | Alheidt et al. |
| 9,351,848 B2 | 5/2016 | Glerum et al. |
| 9,358,126 B2 | 6/2016 | Glerum et al. |
| 9,358,128 B2 | 6/2016 | Glerum et al. |
| 9,370,434 B2 | 6/2016 | Weiman |
| 9,402,739 B2 | 8/2016 | Weiman et al. |
| 9,427,331 B2 | 8/2016 | Arnin |
| 9,452,063 B2 | 9/2016 | Glerum et al. |
| 9,456,903 B2 | 10/2016 | Glerum et al. |
| 9,474,625 B2 | 10/2016 | Weiman |
| 9,486,325 B2 | 11/2016 | Davenport et al. |
| 9,492,288 B2 | 11/2016 | Wagner et al. |
| 9,492,289 B2 | 11/2016 | Davenport et al. |
| 9,522,070 B2 | 12/2016 | Flower et al. |
| 9,539,103 B2 | 1/2017 | McLaughlin et al. |
| 9,539,108 B2 | 1/2017 | Glerum et al. |
| 9,549,824 B2 | 1/2017 | McAfee |
| 9,561,055 B1 * | 2/2017 | Karim ............ A61B 17/7058 |
| 9,561,116 B2 | 2/2017 | Weiman et al. |
| 9,566,168 B2 | 2/2017 | Glerum et al. |
| 9,603,717 B2 | 3/2017 | Ibarra et al. |
| 9,622,878 B2 | 4/2017 | Grotz |
| 9,642,720 B2 | 5/2017 | Radcliffe et al. |
| 9,655,747 B2 | 5/2017 | Glerum et al. |
| 9,662,223 B2 | 5/2017 | Matthis et al. |
| 9,668,876 B2 | 6/2017 | Blain et al. |
| 9,707,095 B2 | 7/2017 | Emstad |
| 9,717,601 B2 | 8/2017 | Miller |
| 9,750,617 B2 | 9/2017 | Lim et al. |
| 9,750,618 B1 | 9/2017 | Daffinson et al. |
| 9,757,249 B2 | 9/2017 | Radcliffe et al. |
| 9,770,343 B2 | 9/2017 | Weiman |
| 9,788,971 B1 | 10/2017 | Stein |
| 9,801,733 B2 | 10/2017 | Wolters et al. |
| 9,801,734 B1 | 10/2017 | Stein et al. |
| 9,833,336 B2 | 12/2017 | Davenport et al. |
| 9,839,528 B2 | 12/2017 | Weiman et al. |
| 9,855,151 B2 | 1/2018 | Weiman |
| 9,867,715 B2 | 1/2018 | McLaughlin et al. |
| 9,872,778 B2 | 1/2018 | Grotz |
| 9,872,779 B2 | 1/2018 | Miller et al. |
| 9,889,019 B2 | 2/2018 | Rogers et al. |
| 9,907,673 B2 | 3/2018 | Weiman et al. |
| 9,913,727 B2 | 3/2018 | Thommen et al. |
| 9,925,062 B2 | 3/2018 | Glerum et al. |
| 9,949,841 B2 | 4/2018 | Glerum et al. |
| 9,956,087 B2 | 5/2018 | Seifert et al. |
| 9,962,270 B2 | 5/2018 | Alheidt et al. |
| 9,962,271 B2 | 5/2018 | Glerum |
| 9,962,272 B1 | 5/2018 | Daffinson et al. |
| 9,980,823 B2 | 5/2018 | Matthis et al. |
| 9,987,143 B2 | 6/2018 | Robinson et al. |
| 10,016,282 B2 | 7/2018 | Seifert et al. |
| 10,028,842 B2 | 7/2018 | Gray et al. |
| 10,034,765 B2 | 7/2018 | Blain et al. |
| 10,034,769 B2 | 7/2018 | Baynham |
| 10,034,772 B2 | 7/2018 | Glerum et al. |
| 10,046,284 B2 | 8/2018 | Ferraris et al. |
| 10,080,669 B2 | 9/2018 | Davenport et al. |
| 10,085,846 B2 | 10/2018 | Grotz |
| 10,092,417 B2 | 10/2018 | Weiman et al. |
| 10,098,756 B2 | 10/2018 | Emstad |
| 10,098,757 B2 | 10/2018 | Logan et al. |
| 10,098,758 B2 | 10/2018 | Matthews et al. |
| 10,098,759 B2 | 10/2018 | Weiman |
| 10,105,238 B2 | 10/2018 | Koch et al. |
| 10,111,755 B2 | 10/2018 | Foley et al. |
| 10,117,754 B2 | 11/2018 | Davenport et al. |
| 10,137,009 B2 | 11/2018 | Weiman et al. |
| 10,154,911 B2 | 12/2018 | Predick et al. |
| 10,154,912 B2 | 12/2018 | Glerum |
| 10,166,117 B1 | 1/2019 | Daffinson et al. |
| 10,172,718 B2 | 1/2019 | Wolters et al. |
| 10,188,527 B2 | 1/2019 | Rogers et al. |
| 10,219,913 B2 | 3/2019 | Matthews et al. |
| 10,219,914 B2 | 3/2019 | Faulhaber |
| 10,219,915 B1 | 3/2019 | Stein |
| 10,226,359 B2 | 3/2019 | Glerum et al. |
| 10,265,191 B2 | 4/2019 | Im et al. |
| 10,278,830 B1 | 5/2019 | Walker et al. |
| 10,285,824 B2 | 5/2019 | Robinson |
| 10,299,934 B2 | 5/2019 | Seifert et al. |
| 10,299,937 B2 | 5/2019 | McAfee |

(56) References Cited

U.S. PATENT DOCUMENTS

| | | |
|---|---|---|
| 10,322,009 B2 | 6/2019 | Aghayev et al. |
| 10,327,917 B2 | 6/2019 | Glerum et al. |
| 10,342,675 B2 | 7/2019 | Alheidt |
| 10,350,085 B2 | 7/2019 | Glerum et al. |
| 10,383,741 B2 | 8/2019 | Butler et al. |
| 10,390,962 B2 | 8/2019 | Weiman |
| 10,398,556 B2 | 9/2019 | Criscione et al. |
| 10,398,563 B2 | 9/2019 | Engstrom |
| 10,398,566 B2 | 9/2019 | Olmos et al. |
| 10,413,422 B2 | 9/2019 | Flower et al. |
| 10,426,632 B2 | 10/2019 | Butler et al. |
| 10,426,633 B2 | 10/2019 | Moskowitz et al. |
| 10,426,634 B1 | 10/2019 | Al-Jazaeri et al. |
| 10,449,056 B2 | 10/2019 | Cain |
| 10,449,058 B2 | 10/2019 | Lechmann et al. |
| 10,470,894 B2 | 11/2019 | Foley et al. |
| 10,485,674 B2 | 11/2019 | Perloff et al. |
| 10,492,924 B2 | 12/2019 | Stein et al. |
| 10,500,064 B2 | 12/2019 | Robinson |
| 10,507,116 B2 | 12/2019 | Shoshtaev |
| 10,537,436 B2 | 1/2020 | Maguire et al. |
| 10,575,964 B2 | 3/2020 | Robinson |
| 10,583,015 B2 | 3/2020 | Olmos et al. |
| 10,617,533 B2 | 4/2020 | Glerum et al. |
| 10,639,166 B2 | 5/2020 | Weiman et al. |
| 2003/0135279 A1 | 7/2003 | Michelson |
| 2010/0082109 A1 | 4/2010 | Greenhalgh et al. |
| 2011/0015742 A1 | 1/2011 | Hong |
| 2012/0215316 A1 | 8/2012 | Mohr et al. |
| 2013/0231747 A1 | 9/2013 | Olmos et al. |
| 2014/0156007 A1 | 6/2014 | Pabst et al. |
| 2014/0163682 A1 | 6/2014 | Iott et al. |
| 2015/0051703 A1 | 2/2015 | Glerum et al. |
| 2016/0051377 A1 | 2/2016 | Weiman et al. |
| 2016/0081814 A1* | 3/2016 | Baynham ............... A61F 2/447 623/17.16 |
| 2016/0256291 A1 | 9/2016 | Miller |
| 2017/0035577 A1 | 2/2017 | Iott et al. |
| 2017/0100257 A1 | 4/2017 | Weiman et al. |
| 2017/0143507 A1 | 5/2017 | Flower et al. |
| 2017/0290675 A1 | 10/2017 | Olmos et al. |
| 2017/0290677 A1 | 10/2017 | Olmos et al. |
| 2017/0296352 A1 | 10/2017 | Richerme et al. |
| 2017/0354512 A1 | 12/2017 | Weiman et al. |
| 2018/0034485 A1 | 2/2018 | Marelli et al. |
| 2018/0055652 A1 | 3/2018 | Davenport et al. |
| 2018/0116816 A1 | 5/2018 | Weiman et al. |
| 2018/0116817 A1 | 5/2018 | Weiman et al. |
| 2018/0147065 A1 | 5/2018 | Daffinson et al. |
| 2018/0147066 A1 | 5/2018 | Daffinson et al. |
| 2018/0177605 A1 | 6/2018 | Glerum et al. |
| 2018/0185163 A1* | 7/2018 | Weiman ............... A61F 2/442 |
| 2018/0193160 A1* | 7/2018 | Hsu ............... A61F 2/447 |
| 2018/0193164 A1 | 7/2018 | Shoshtaev |
| 2018/0200075 A1 | 7/2018 | Baker et al. |
| 2018/0207002 A1 | 7/2018 | Glerum et al. |
| 2018/0256356 A1 | 9/2018 | Robinson et al. |
| 2018/0271674 A1 | 9/2018 | Glerum et al. |
| 2018/0289508 A1 | 10/2018 | Glerum |
| 2018/0296361 A1 | 10/2018 | Butler et al. |
| 2018/0303625 A1 | 10/2018 | Alheidt et al. |
| 2018/0303626 A1 | 10/2018 | Rogers et al. |
| 2018/0303627 A1 | 10/2018 | Gray et al. |
| 2018/0311048 A1 | 11/2018 | Glerum et al. |
| 2018/0318102 A1 | 11/2018 | Seifert et al. |
| 2018/0325691 A1 | 11/2018 | Rajpal |
| 2018/0325693 A1 | 11/2018 | Weiman et al. |
| 2018/0338838 A1 | 11/2018 | Cryder et al. |
| 2018/0338840 A1 | 11/2018 | Glerum et al. |
| 2018/0344485 A1 | 12/2018 | McLuen et al. |
| 2018/0360616 A1 | 12/2018 | Luu |
| 2019/0000640 A1 | 1/2019 | Weiman |
| 2019/0038435 A1 | 2/2019 | Daffinson et al. |
| 2019/0060083 A1 | 2/2019 | Weiman et al. |
| 2019/0076263 A1 | 3/2019 | Emstad |
| 2019/0133780 A1 | 5/2019 | Matthews et al. |
| 2019/0133784 A1 | 5/2019 | Gunn et al. |
| 2019/0231553 A1 | 8/2019 | McLuen et al. |
| 2019/0240039 A1 | 8/2019 | Walker et al. |
| 2019/0240042 A1 | 8/2019 | McAfee |
| 2019/0254836 A1 | 8/2019 | Cowan et al. |
| 2019/0262139 A1 | 8/2019 | Wolters |
| 2019/0269521 A1 | 9/2019 | Shoshtaev |
| 2019/0282373 A1 | 9/2019 | Alheidt |
| 2019/0298540 A1 | 10/2019 | Aghayev et al. |
| 2019/0307577 A1 | 10/2019 | Predick et al. |
| 2019/0321190 A1 | 10/2019 | Wagner et al. |
| 2019/0336301 A1 | 11/2019 | Engstrom |
| 2019/0358051 A1 | 11/2019 | Flower et al. |
| 2019/0374348 A1 | 12/2019 | Butler et al. |
| 2019/0388232 A1 | 12/2019 | Purcell et al. |
| 2020/0008951 A1 | 1/2020 | McClintock et al. |
| 2020/0038200 A1 | 2/2020 | Foley et al. |
| 2020/0054461 A1 | 2/2020 | Marrocco et al. |
| 2020/0078190 A1 | 3/2020 | Rogers et al. |
| 2020/0093609 A1 | 3/2020 | Shoshtaev |
| 2020/0100904 A1 | 4/2020 | Stein et al. |
| 2020/0129307 A1 | 4/2020 | Hunziker et al. |
| 2020/0163775 A1* | 5/2020 | Kim ............... A61F 2/447 |
| 2020/0179132 A1 | 6/2020 | Logan et al. |

FOREIGN PATENT DOCUMENTS

| | | |
|---|---|---|
| EP | 1293181 A2 | 3/2003 |
| EP | 1372541 A1 | 1/2004 |
| EP | 1411871 A1 | 4/2004 |
| EP | 1532949 A1 | 5/2005 |
| EP | 1567096 A1 | 8/2005 |
| EP | 1589906 A2 | 11/2005 |
| EP | 1843723 A1 | 10/2007 |
| EP | 2237748 A1 | 10/2010 |
| EP | 2347735 A1 | 7/2011 |
| EP | 2588035 A1 | 5/2013 |
| EP | 2611395 A1 | 7/2013 |
| EP | 2645950 A1 | 10/2013 |
| EP | 2688519 A2 | 1/2014 |
| EP | 2691051 A1 | 2/2014 |
| EP | 2735286 A1 | 5/2014 |
| EP | 2764851 A1 | 8/2014 |
| EP | 2768435 A1 | 8/2014 |
| EP | 2777630 A1 | 9/2014 |
| EP | 2992859 A1 | 3/2016 |
| EP | 3095416 A1 | 11/2016 |
| EP | 3253335 A1 | 12/2017 |
| EP | 3291769 A1 | 3/2018 |
| EP | 3421013 A1 | 1/2019 |
| EP | 3470022 A1 | 4/2019 |
| EP | 3482723 A1 | 5/2019 |
| EP | 3515369 A1 | 7/2019 |
| EP | 3603580 A1 | 2/2020 |
| EP | 3622920 A1 | 3/2020 |
| EP | 3662868 A1 | 6/2020 |
| WO | 200245624 A1 | 6/2002 |
| WO | 2011142761 A1 | 11/2011 |
| WO | 2016182837 A1 | 11/2016 |
| WO | 2017051416 A1 | 3/2017 |
| WO | 2018002711 A2 | 1/2018 |
| WO | 2018002715 A2 | 1/2018 |
| WO | 2018111510 A1 | 6/2018 |
| WO | 2018132502 A1 | 7/2018 |
| WO | 2018200507 A1 | 11/2018 |
| WO | 2018200530 A1 | 11/2018 |
| WO | 2018208583 A1 | 11/2018 |
| WO | 2018231563 A1 | 12/2018 |
| WO | 2019014139 A1 | 1/2019 |
| WO | 2019023251 A1 | 1/2019 |
| WO | 2019165157 A1 | 8/2019 |
| WO | 2019169036 A1 | 9/2019 |
| WO | 2019169302 A1 | 9/2019 |
| WO | 2019170739 A1 | 9/2019 |
| WO | 2019170744 A1 | 9/2019 |
| WO | 2019191745 A1 | 10/2019 |
| WO | 2019241687 A1 | 12/2019 |
| WO | 2019246441 A1 | 12/2019 |

(56) References Cited

FOREIGN PATENT DOCUMENTS

| WO | 2020068445 A1 | 4/2020 |
| WO | 2020084158 A1 | 4/2020 |
| WO | 2020209722 A1 | 10/2020 |

OTHER PUBLICATIONS

Emstad et al., "The VariLift Interbody Fusion System: expandable, standalone interbody fusion" Medical Devices: Evidence and Research, Dovepress May 26, 2015.

\* cited by examiner

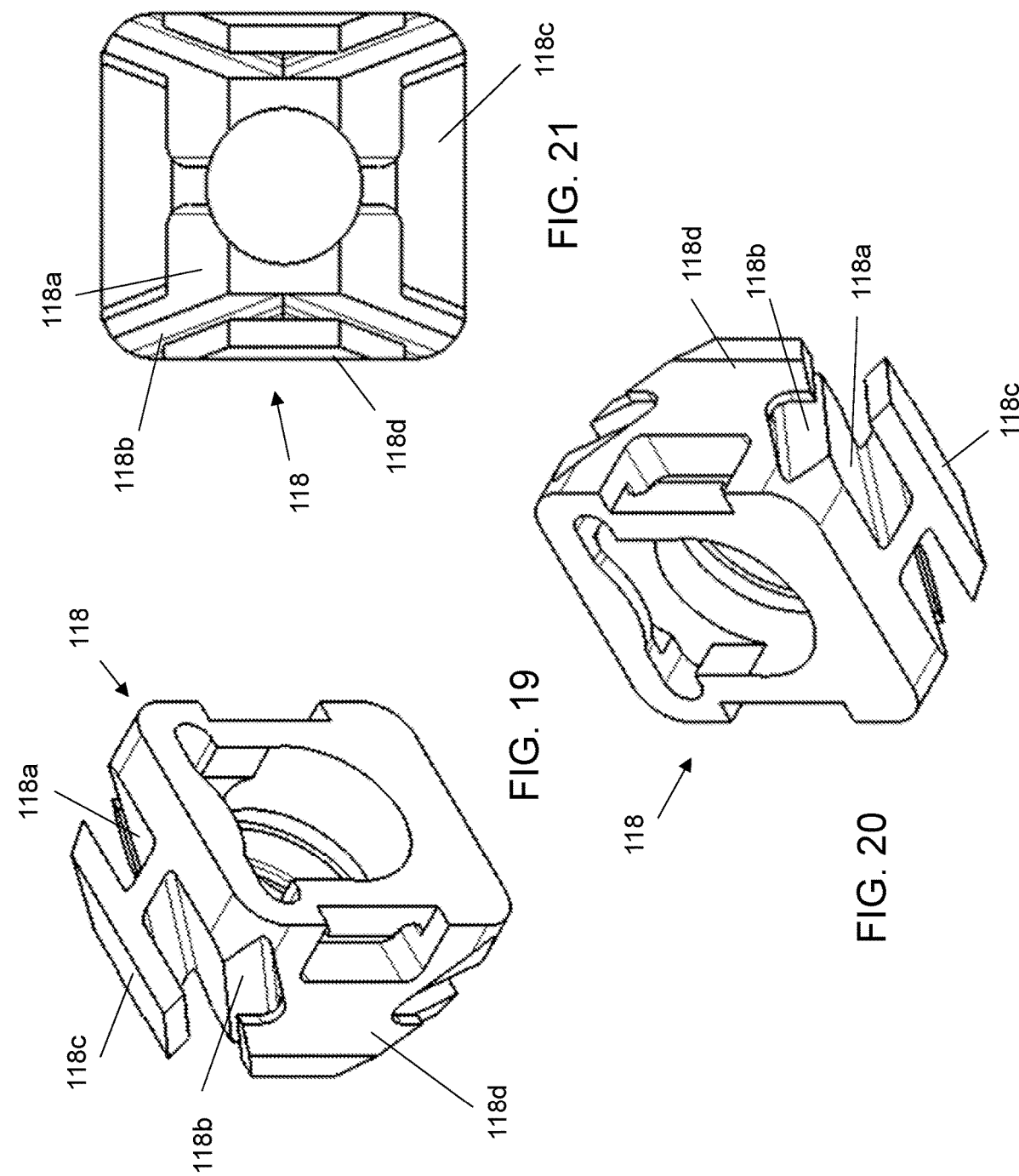

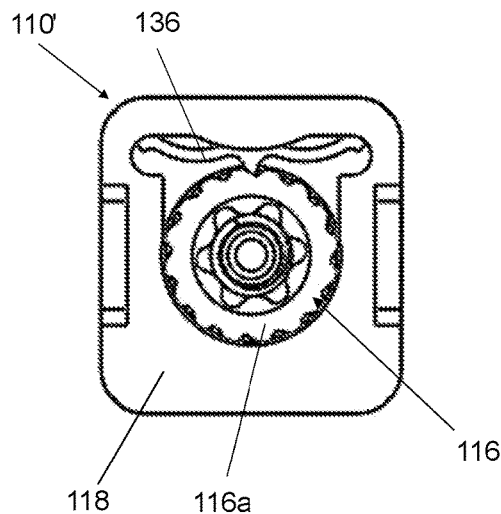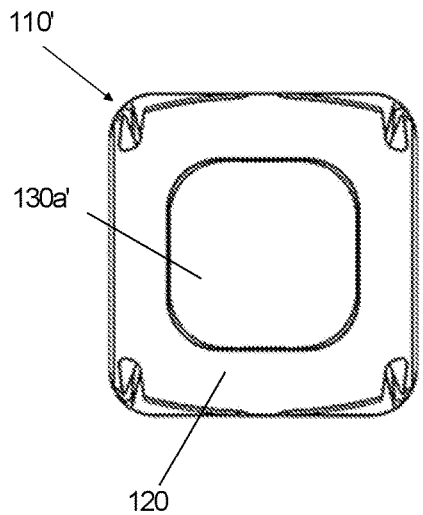
FIG. 27  FIG. 28
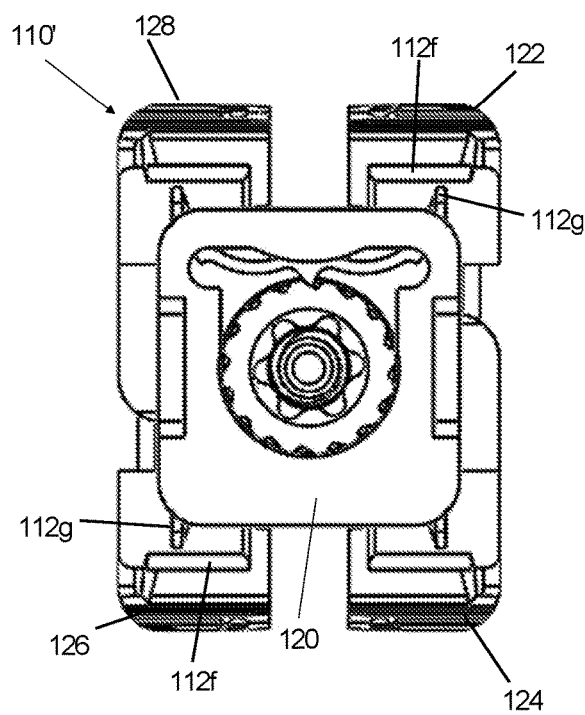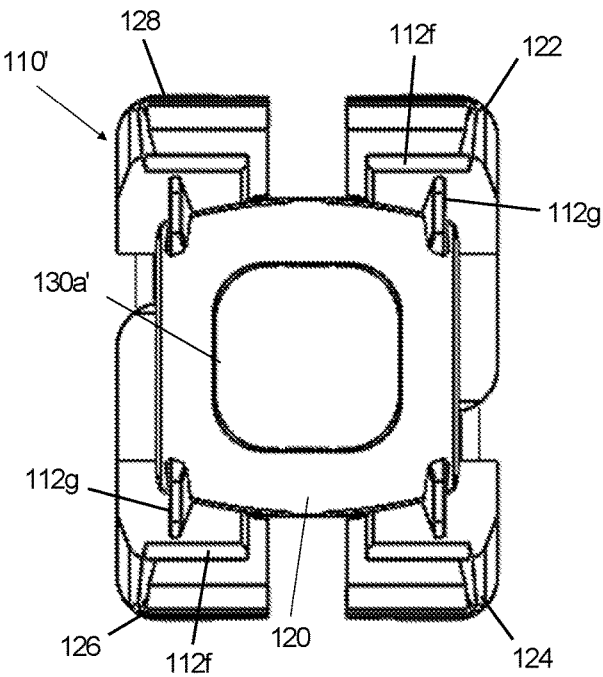
FIG. 29  FIG. 30

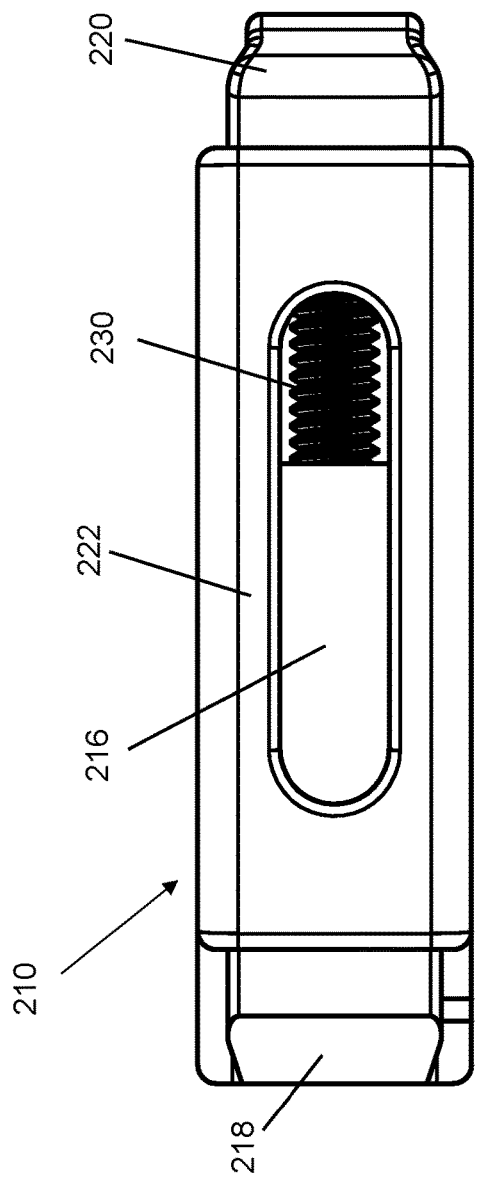
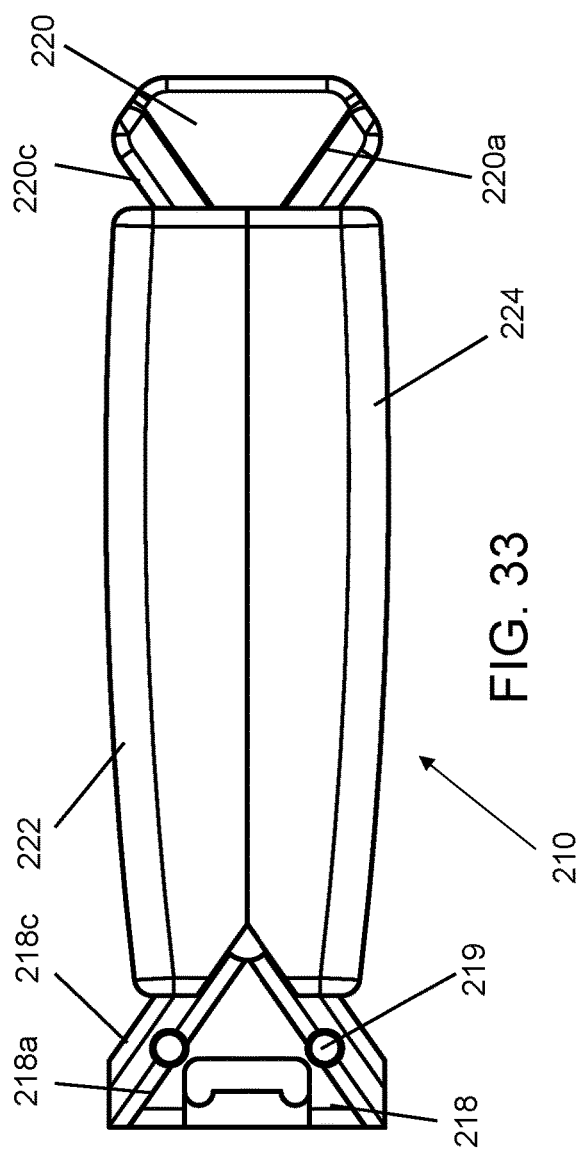
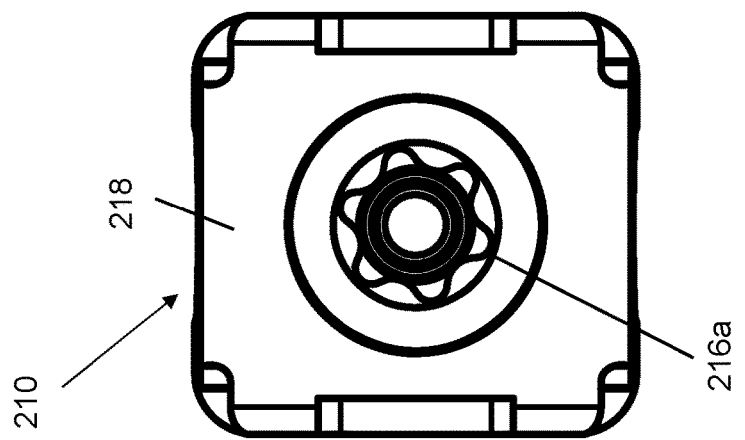
FIG. 34
FIG. 33
FIG. 35

VERTICALLY AND LATERALLY EXPANDABLE VERTEBRAL CAGE

CROSS REFERENCE TO RELATED APPLICATIONS

The present application is a 371 National Stage patent application of PCT Application No. PCT/US2021/070231, filed Mar. 4, 2021, which claims the filing benefits of U.S. provisional application Ser. No. 62/985,376, filed Mar. 5, 2020, which is hereby incorporated herein by reference in its entirety.

FIELD OF THE INVENTION

The present disclosure relates generally to medical devices for implanting in a patient's spine to adjust or maintain spacing between vertebrae.

BACKGROUND OF THE INVENTION

It is known to use expandable devices to adjust or maintain relative position of adjacent vertebrae of a patient. Examples of known devices are described in U.S. Pat. Nos. 8,940,048; 8,105,382 and 8,894,712 and U.S. Publication No. US-2019-0388232.

SUMMARY OF THE INVENTION

The vertically and laterally expandable and contractible/retractable cage or device described herein provides for laterally and vertically movable plates or elements that are moved and guided via ramps and retaining or keeping elements as a base assembly of the device is shortened or lengthened. The base assembly is adjustable via adjustment of an adjustment mechanism, such as rotational driving of a threaded drive shaft, and the plates or elements are disposed at respective quadrants around the base assembly, with the plates moving together and in tandem as the base assembly is adjusted. The ramps and keeping elements are configured to guide and move the plates both laterally and vertically, while sets of plates are movably joined together so that the plates of each set move laterally in tandem with one another while also moving vertically apart.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

FIGS. 19 and 20 are perspective views of one of the end portions of the device;

FIG. 21 is an inward end view of the end portion of FIGS. 19 and 20;

FIGS. 27 and 28 are opposite end views of the contracted device of FIG. 23;

FIGS. 29 and 30 are opposite end views of the expanded device of FIG. 24;

FIG. 33 is a side elevation of a vertically expandable cage having upper and lower plates that move relative to one another via an adjustment mechanism;

FIG. 34 is a top plan view of the vertically expandable cage of FIG. 33;

FIG. 35 is an end elevation of the vertically expandable cage of FIG. 33;

DETAILED DESCRIPTION

Figure 1:
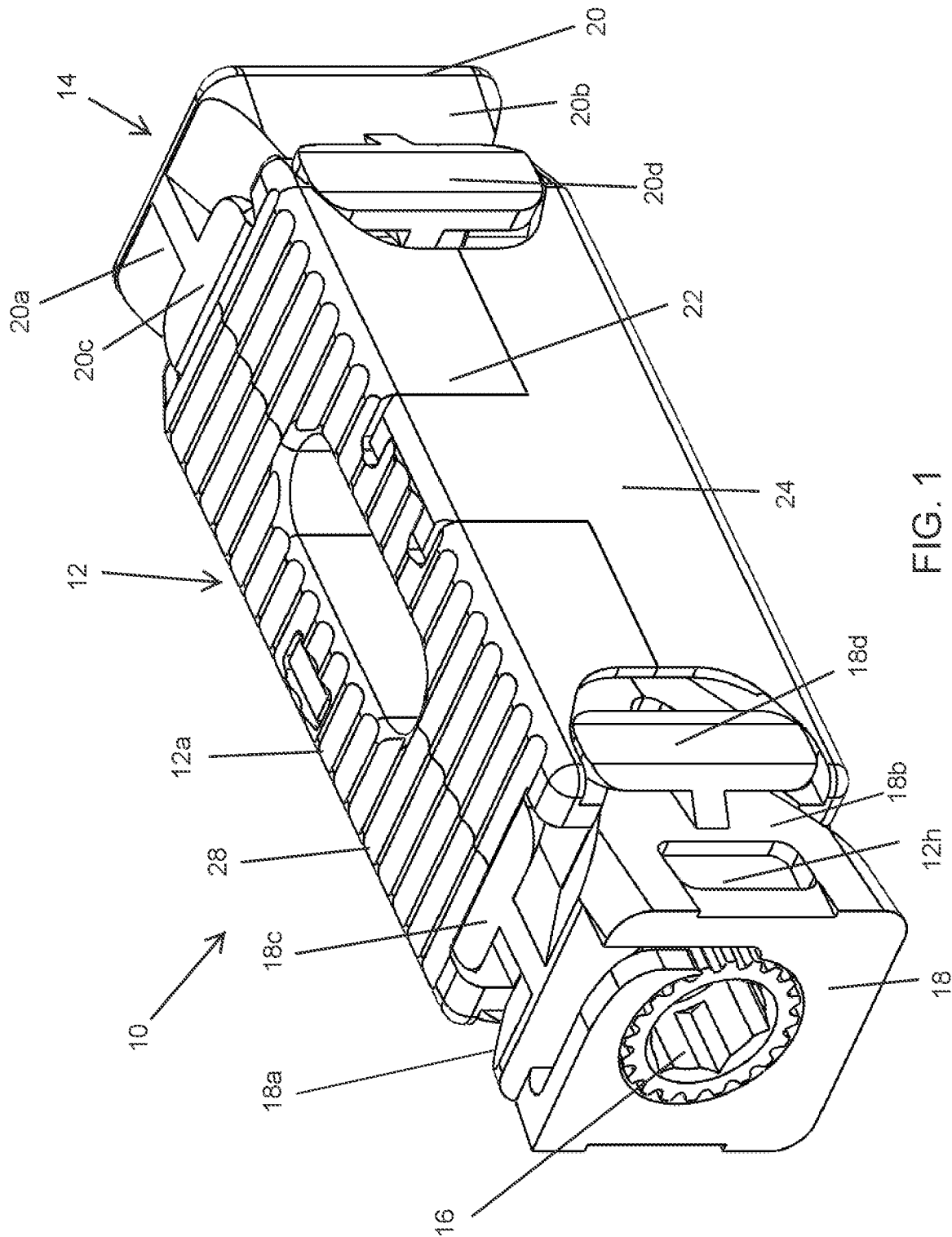
FIG. 1 is a perspective view of a vertically and laterally expandable and contractible cage or device that includes a plurality of plate sections that are movably disposed at a base and that are movable laterally and vertically relative to the base in accordance with the principles of the present disclosure, shown in the contracted state.
Figure 2:
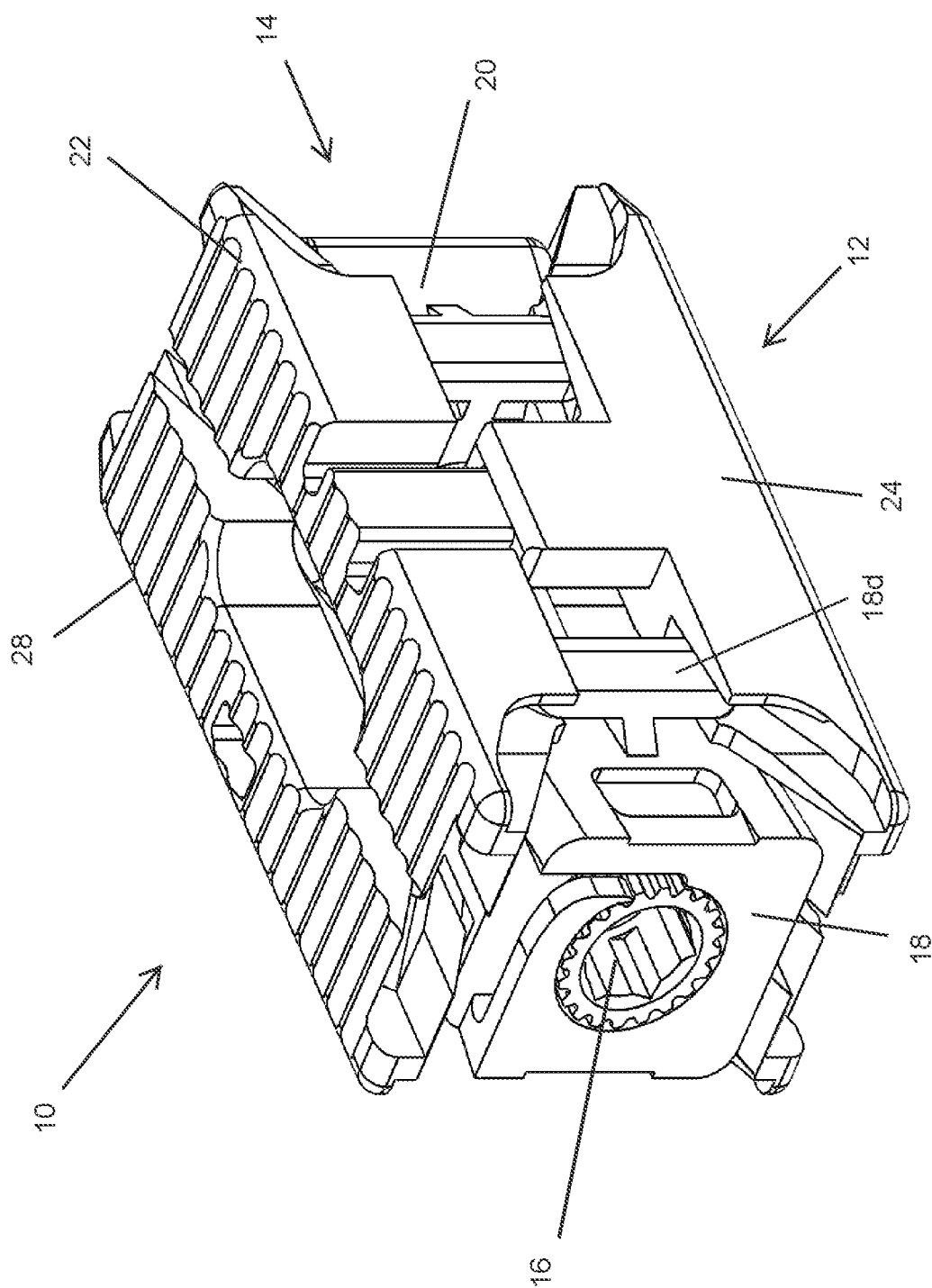
FIG. 2 is another perspective view of the device of FIG. 1, shown in an expanded state.
Figure 3:
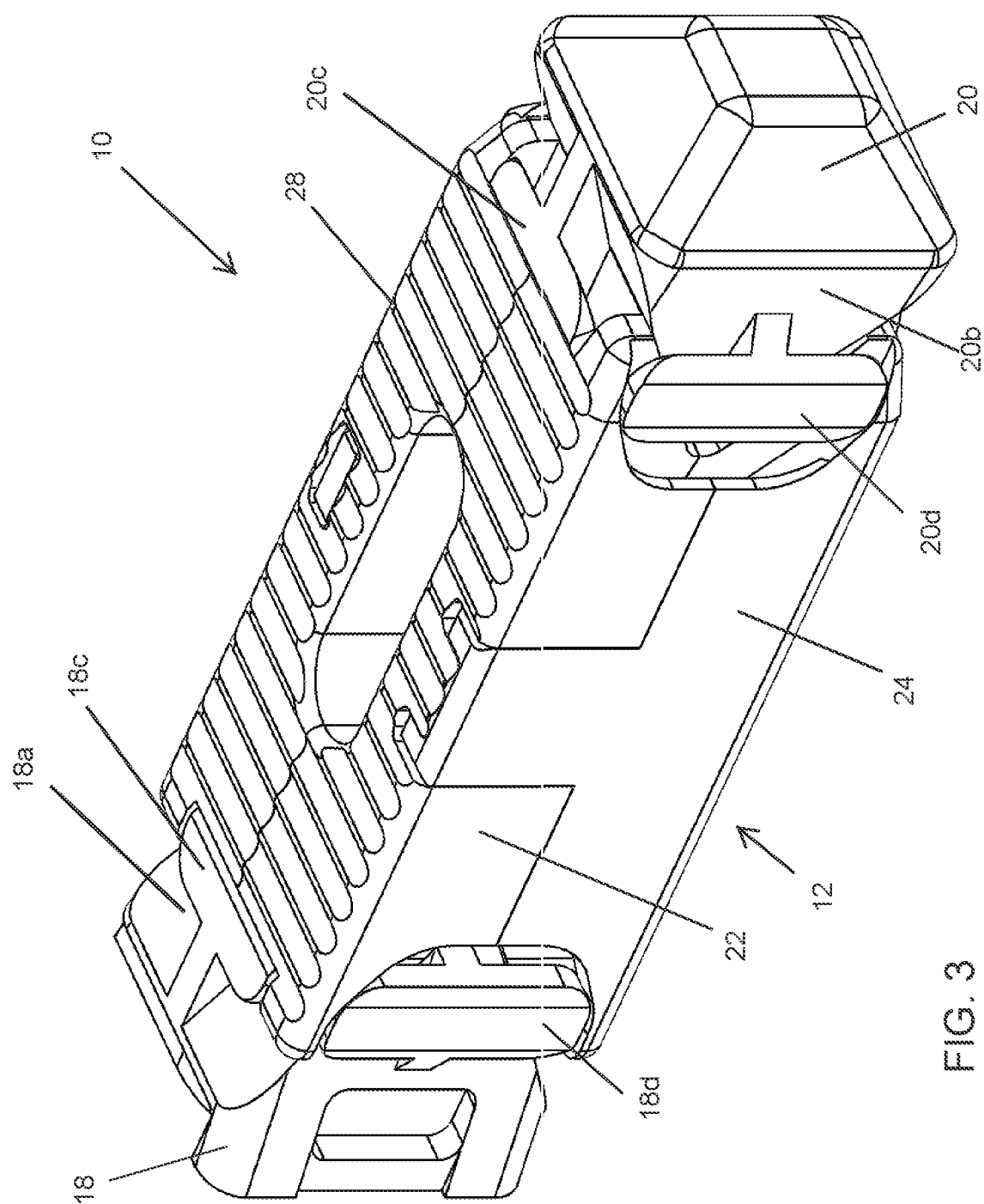
FIG. 3 is another perspective view of the device of FIG. 1, shown in the contracted state.
Figure 4:
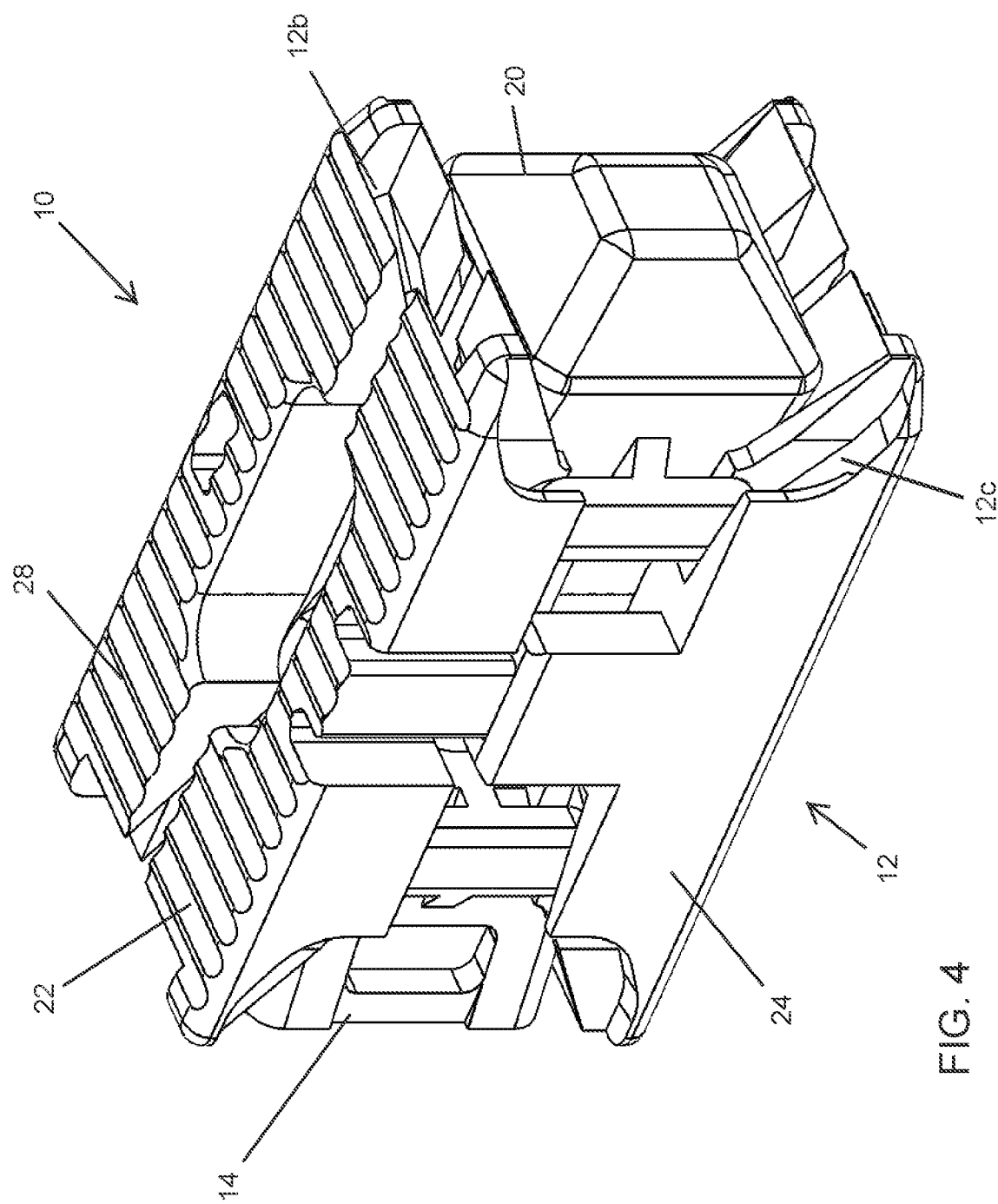
FIG. 4 is another perspective view of the device of FIG. 2, shown in the expanded state.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Referring to FIGS. 1-4, a vertebral cage or device 10 includes a plurality of plates or elements 12 that are vertically and laterally adjustable relative to a base assembly 14 responsive to adjustment of an adjustment mechanism 16 of the base assembly. The adjustment mechanism functions or operates to cause a first end portion 18 of the base assembly to move relative to a second end portion 20 of the base assembly, which causes the plates to move outward away from a central axis of the base assembly during expansion of the device or causes the plates to move inward toward the central axis of the base assembly during retraction of the device, as discussed below.

In the illustrated embodiment, the adjustment mechanism comprises a rotatable drive shaft 16 that is rotatably disposed at the first end portion 18 of the base assembly and that rotatably engages or threadedly engages a threaded shaft 30 at the second end portion 20 of the base assembly. When the shaft 16 is rotated in one direction, the end portions or duplex wedges 18, 20 of the base assembly are drawn toward one another, which causes the plates 12 to move outward away from the central or longitudinal axis of the base assembly, as discussed below. When the shaft is rotated in the opposite direction, the end portions 18, 20 of the base assembly are moved away from one another, which causes the plates 12 to move inward and toward the central or longitudinal axis of the base assembly, as also discussed below. The plates 12 comprise four plates 22, 24, 26, 28 that are configured to move relative to one another and to the base assembly.

Figure 5:
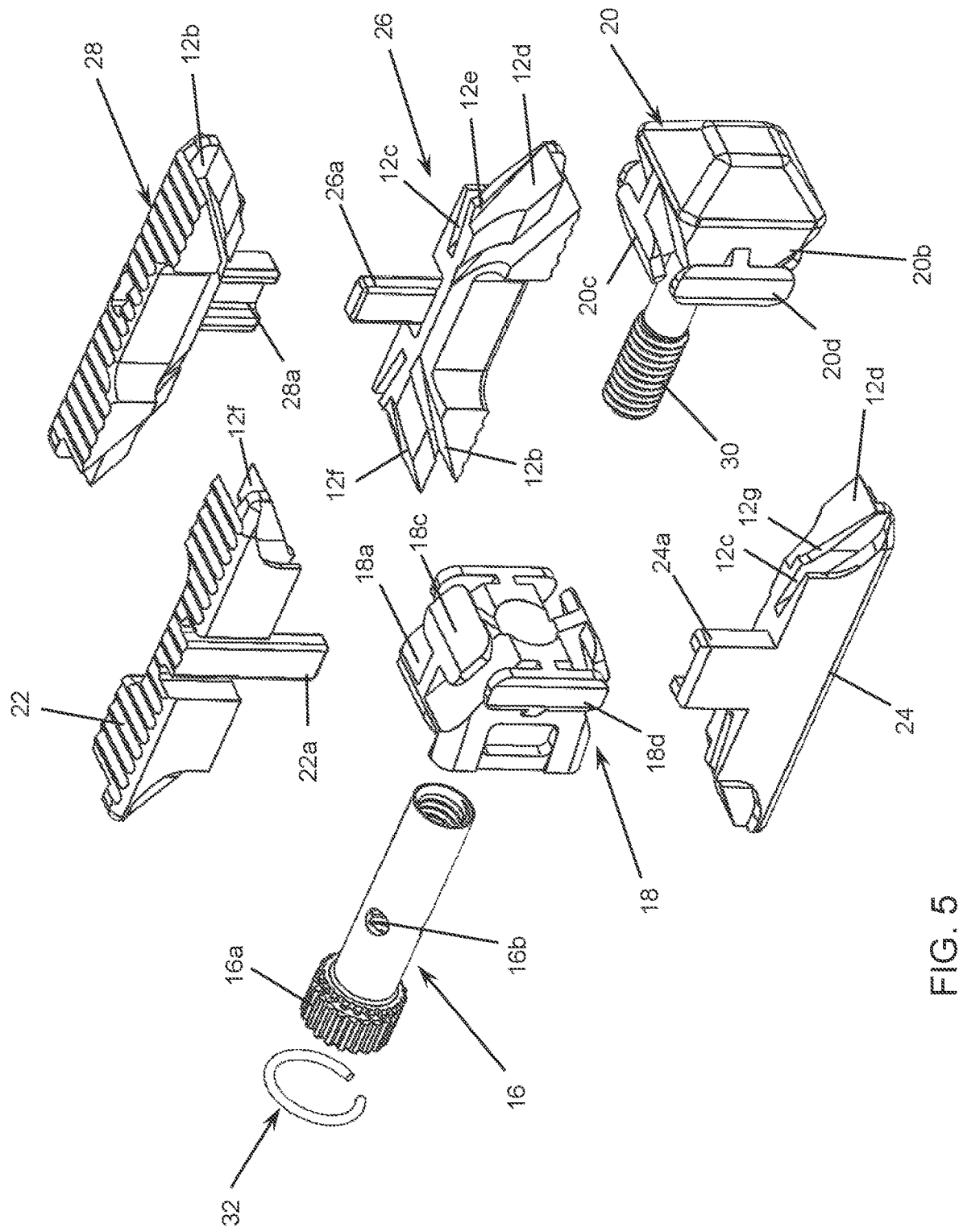
FIG. 5 is an exploded perspective view of the device.
Figure 9:
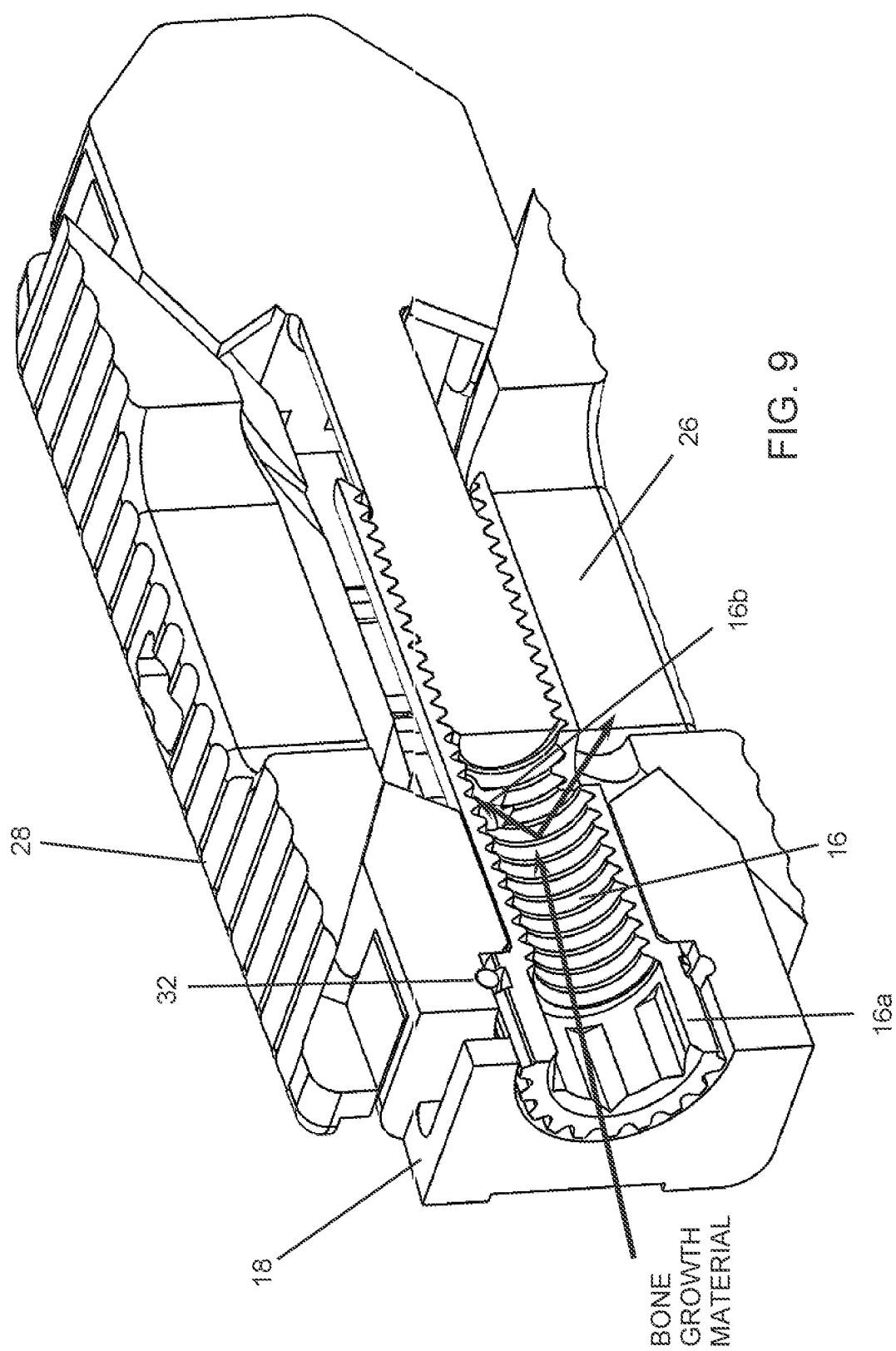
FIG. 9 is an enlarged perspective and partial sectional view of the device.
Figure 10A:
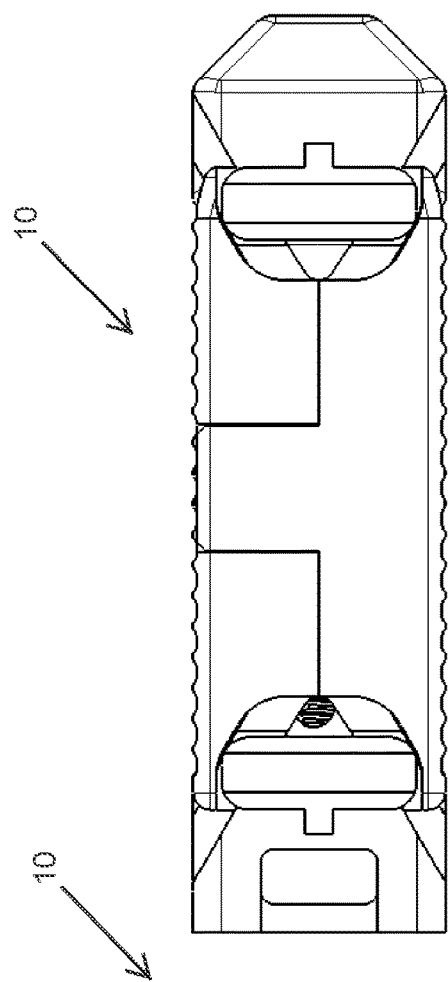
FIGS. 10A and 10B are views of the device in its contracted state.
Figure 10B:
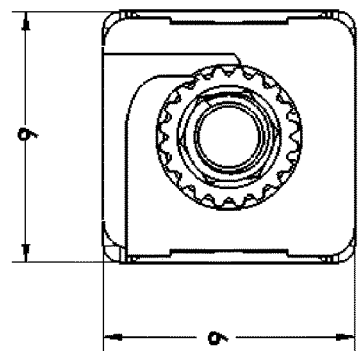
Figure 11A:
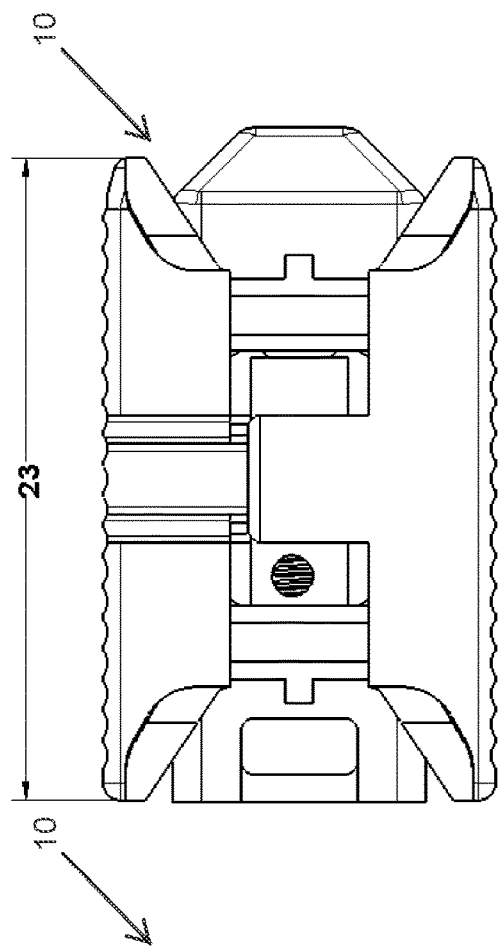
FIGS. 11A and 11B are views of the device in its expanded state.
Figure 11B:
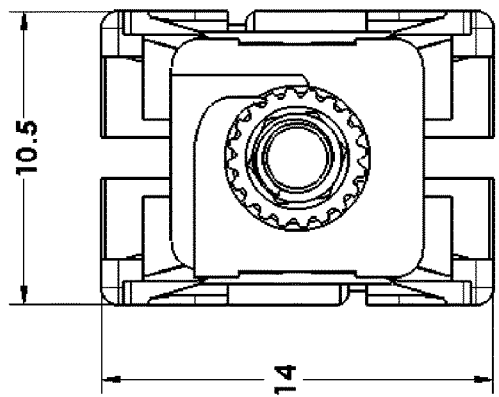
Figure 12:
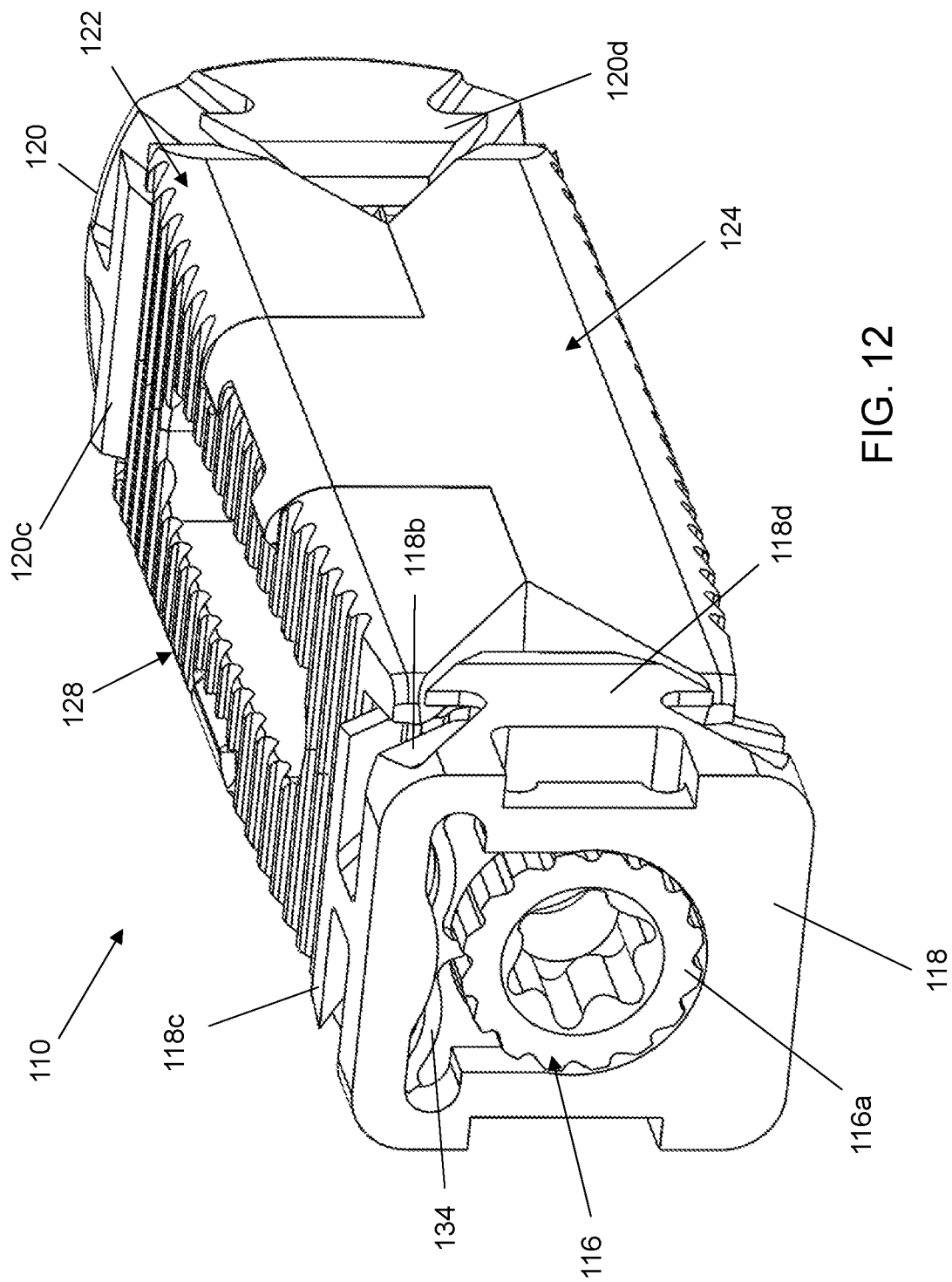
FIG. 12 is a perspective view of another vertically and laterally expandable and contractible cage or device, shown in the contracted state.
Figure 13:
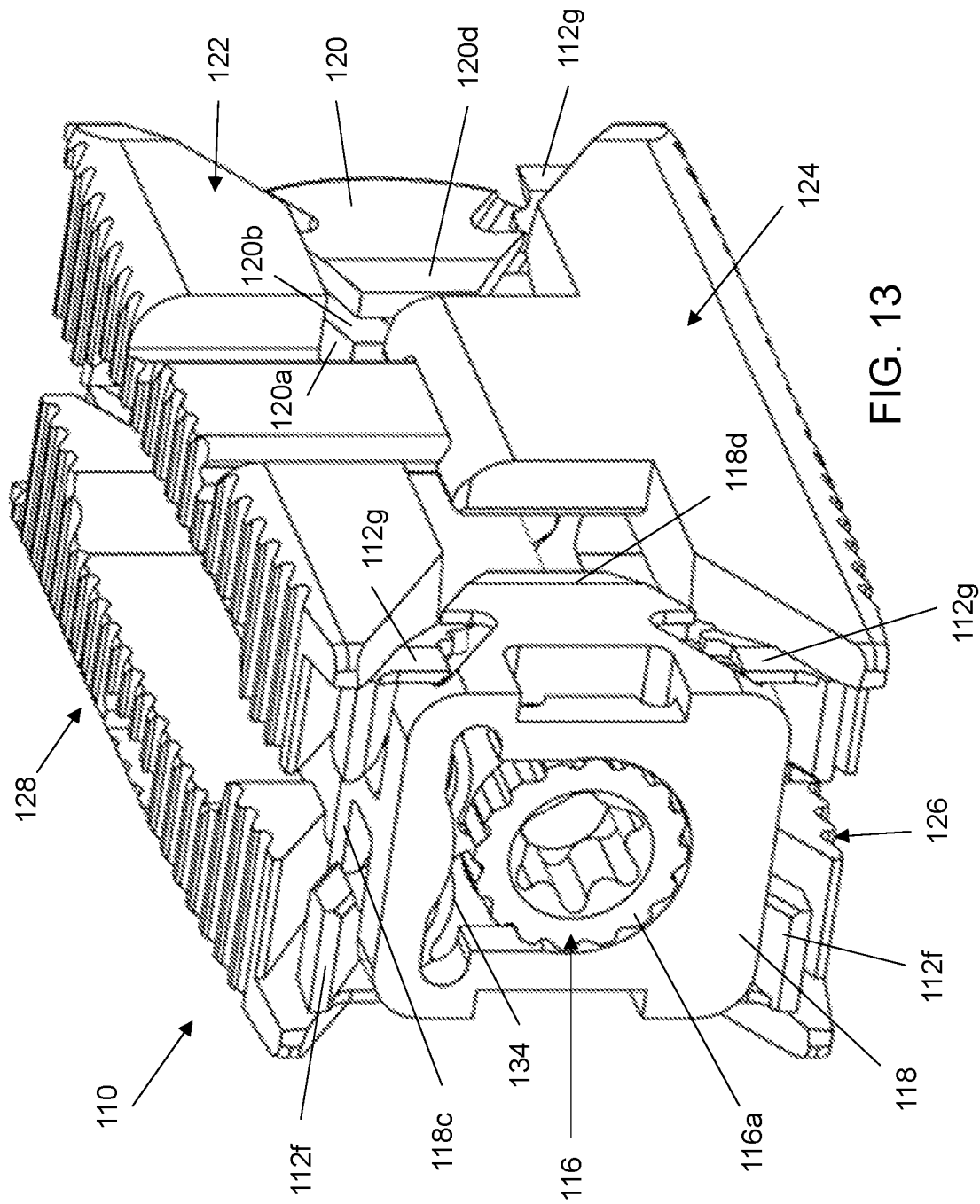
FIG. 13 is another perspective view of the device of FIG. 12, shown in the expanded state.

As best shown in FIG. 5, the base assembly 14 includes the end portions 18, 20 and the shaft 16, which is received through an aperture in the proximal end portion 18 and that threadedly engages a threaded shaft 30 of the distal end portion 20. The shaft is rotatably disposed in the proximal end portion 18 and longitudinally retained therein such that the shaft rotates relative to the proximal end portion but does not move longitudinally along the central axis of the shaft relative to the proximal end portion. As can be seen with reference to FIGS. 5 and 9, a lock ring or C-ring 32 is disposed at the head 16a of the shaft 16 and is received at a groove at the head of the shaft and in a groove at the passageway or aperture of the proximal end portion to retain the shaft in place at the proximal end portion while allowing for rotation of the shaft relative to the proximal end portion. Thus, rotation of the shaft 16 causes movement of the distal end portion relative to the proximal end portion to cause expansion and contraction of the cage or device.

The shaft 16 comprises a hollow shaft having internal threads for engaging the external threads of the threaded shaft 30. The shaft 16 may include apertures 16b to allow for introduction of bone growth material into the hollow shaft (after the device is in place at the spine of the patient and partially expanded), whereby the bone growth material may flow through the apertures to the appropriate locations within the patient.

The proximal end portion 18 of the base assembly includes a ratchet pawl or element 34 that engages teeth at the head 16a of the shaft 16 to allow for rotation of the shaft in one direction (such as in a clockwise direction that adjusts the device toward the expanded state) and limits rotation of the shaft 16 in the opposite direction. The ratchet element 34 comprises a flexible element that is integral with or part of the end portion 18 and that flexes relative to the body of the end portion 18 and relative to the shaft 16 to allow for ratcheting of the shaft head in the one direction, with the end of the flexible element and/or the teeth of the shaft head formed to limit flexing of the element when the shaft attempts to rotate in the opposite direction. Thus, when the device is expanded to an expanded state, the shaft does not readily rotate in the opposite direction to contract the device, such that the device maintains in the state that it is set to and unintentional backing out of the shaft in the opposite direction is limited or substantially precluded. The ratchet element is configured to allow for rotation of the shaft head in the opposite direction when sufficient torque is applied at the shaft head, so that the device may be adjusted toward its compacted or retracted state to draw the plates toward the central axis of the base assembly if desired.

Figure 6:
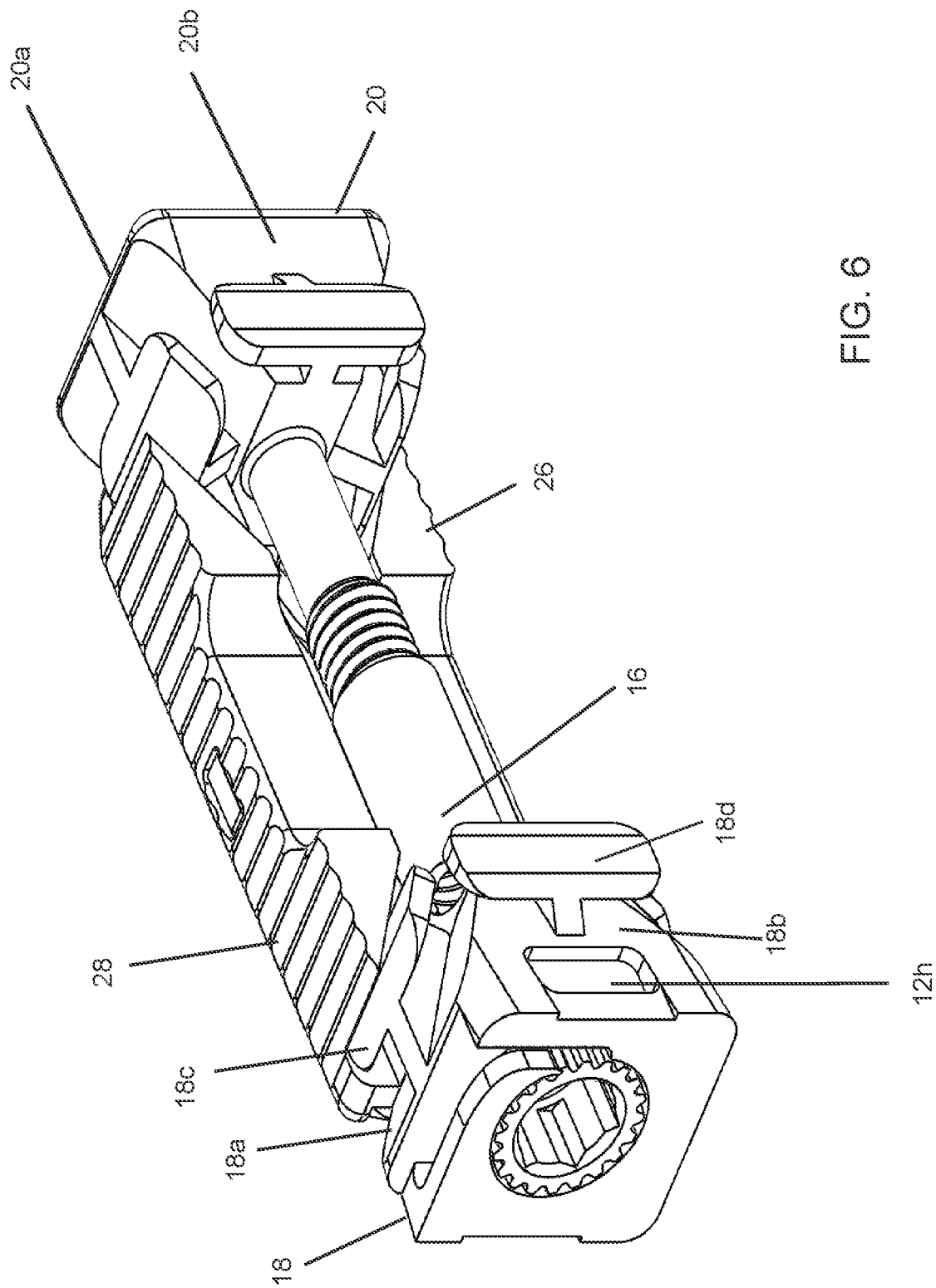
FIG. 6 is another perspective view similar to FIG. 1, but with the upper and lower plates at one side removed to show additional details.
Figure 7:
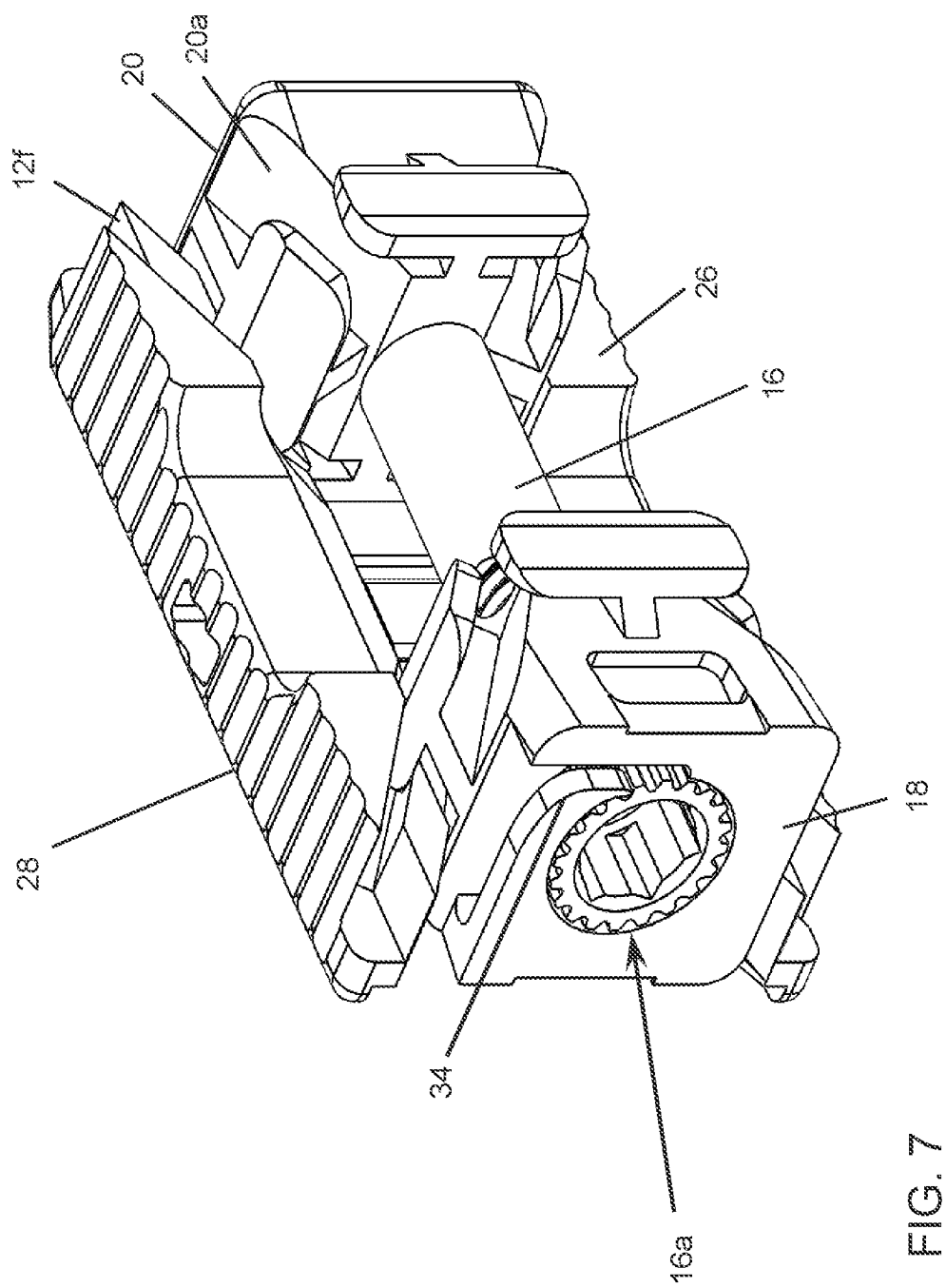
FIG. 7 is another perspective view similar to FIG. 2, but with the upper and lower plates at one side removed to show additional details.
Figure 8:
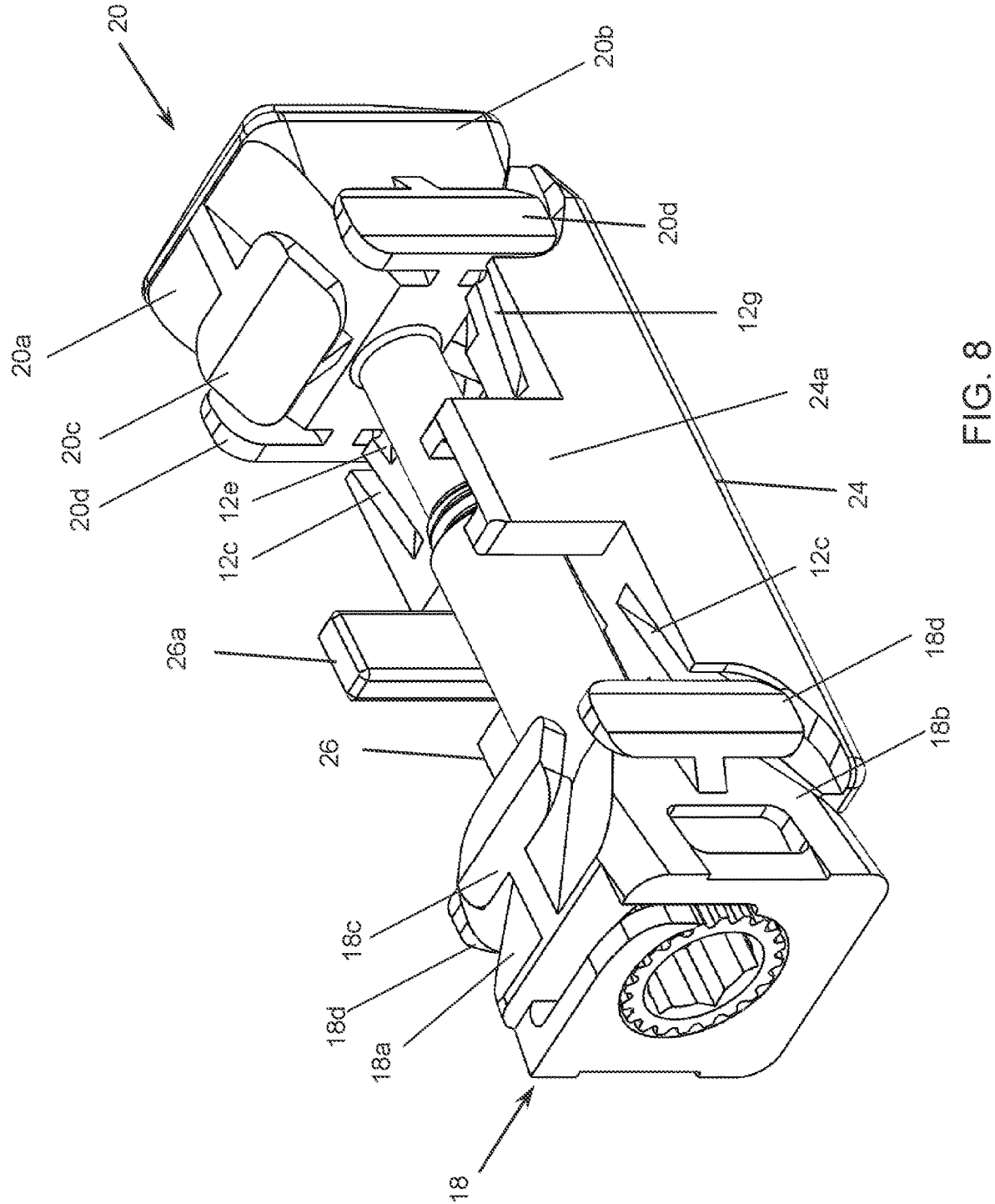
FIG. 8 is a perspective view similar to FIG. 6, but with the upper plates removed to show additional details.

As shown in FIGS. 5 and 6, each of the end portions 18, 20 of the base assembly includes vertical expansion ramps 18a, 20a and lateral expansion ramps 18b, 20b that are configured for engagement of corresponding ramps of the respective plates 12. Each of the end portions 18, 20 also includes vertical endplate keepers 18c, 20c at the vertical expansion ramps 18a, 20a, and lateral endplate keepers 18d, 20d at the lateral expansion ramps 18b, 20b. As best sheen in FIG. 5, the keepers 18c, 18d, 20c, 20d comprise ramped or angled elements that are spaced from the respective ramps 18a, 18b, 20a, 20b with an angled gap or channel established between the opposed surfaces of the respective ramps and keepers for receiving and guiding portions of the plates therein. The angled surfaces of the keepers are parallel to the angled ramped surfaces 18b, 20b of the end portions, and the plates include guide elements (discussed below) with corresponding surfaces, such that the plates move along the surfaces during expansion and contraction of the device.

As shown in FIG. 5, the plates 12 comprise two sets of plates, with each set comprising a male end plate 22, 26 and a female end plate 24, 28. Each plate has an outer surface 12a that is configured for engaging the vertebrae. The male end plates 22, 26 include an extending portion 22a, 26a that extends from the plate body and that is slidably received in a receiving portion 24a, 28a of the female end plates 24, 28. In the illustrated embodiment, the sets of plates are reversed, so that the set of plates 22, 24 on one side have the male plate 22 disposed above the respective female plate 24, while the set of plates 26, 28 on the other side have the female plate 28 disposed above the respective male plate 26.

Each of the plate bodies has a pair of channels formed at each end of the body, with the pair of channels including a vertical keeper guide channel 12b and a lateral keeper guide channel 12c. The vertical keeper guide channels 12b receive and guide a respective part of a respective vertical keeper therein and therealong during expansion and contraction of the device. Similarly, the lateral keeper guide channels 12c receive and guide a respective part of a respective lateral keeper therein and therealong during expansion and contraction of the device.

Each of the plates includes a vertical expansion ramp 12d and a lateral expansion ramp 12e that engage the respective vertical expansion ramps 18a, 20a and lateral expansion ramps 18b, 20b of the end portions 18, 20 of the base assembly. During expansion of the device, the ramped surfaces 18a, 20a, 18b, 20b of the end portions 18, 20 engage the respective ramped surfaces 12d, 12e to vertically and laterally expand the device, while the keepers 18c, 20c, 18d, 20d move along the channels and keep the plates in close proximity to the end portions (i.e., the plates cannot move further outboard than the amount provided by the ramped surfaces 18a, 20a, 18b, 20b and the keepers 18c, 20c, 18d, 20d). During retraction or collapsing of the device, the keepers 18c, 20c, 18d, 20d move along the channels and function to draw the plates toward the central axis of the base assembly.

The vertical keeper guide channels 12b are defined by a ramped surface of the base portion of the plate body and an opposing and correspondingly angled or ramped surface of a vertical guide element or member 12f that protrudes from the base portion of the plate. The vertical guide element or member 12f is movably received between the opposing and parallel surfaces of the respective vertical keeper 18c, 20c and the ramped surfaces 18a, 20a of the respective end portion 18, 20. During expansion of the device, the ramped surfaces 18a, 20a engage the respective surface of the vertical guide element or member 12f to urge the plates apart, and during retraction of the device, the ramped surfaces of the keepers 18c, 20c engage the opposite surface of the vertical guide element or member 12f to urge the plates toward one another.

Likewise, the lateral keeper guide channels 12c are defined by a ramped surface of the base portion of the plate body and an opposing and correspondingly angled or ramped surface of a lateral guide element or member 12g that protrudes from the plate body. The lateral guide element or member 12g is movably received between the opposing and parallel surfaces of the lateral keeper 18d, 20d and the ramped surfaces 18b, 20b of the respective end portion 18, 20. During expansion of the device, the ramped surfaces 18b, 20b engage the respective surface 12e of the lateral guide element or member 12g to urge the plates apart, and during retraction of the device, the ramped surfaces of the keeper 18d, 20d engage the opposite surface of the lateral guide element or member 12g to urge the plates toward one another.

The device 10 is configured to be inserted into a patient such that the upper surfaces 12a of the plates 22, 28 are at one vertebrae and the lower surfaces 12a of the plates 24, 26 are at another vertebrae, with the device located in the intervertebral space between the vertebrae. The device may be positioned in the intervertebral space via an instrument and the base assembly may include connecting or retaining elements or recesses 12h that allow for an instrument to grasp the device and move it into position. When the device is located at the appropriate location in the intervertebral space, the threaded drive shaft is rotatably driven (such as via a hex drive or other suitable driving means) to cause the end portions 18, 20 to be drawn toward one another to cause the plates to move vertically and laterally until the device is expanded the desired amount and is contact with the upper and lower vertebrae.

As can be seen by comparing FIGS. 1 and 2, FIGS. 3 and 4, and FIGS. 6 and 7, as the distal end portion 20 of the base assembly is drawn toward the proximal end portion 18 of the base assembly, the ramped or angled ends 12d of the plates move along the vertical expansion ramps 18a, 20a to move the plates in a vertical direction while the vertical keepers 18c, 20c move along the channels 12b (i.e., while the vertical guide element 12f of each plate moves along the space or channel between the opposing surfaces of the ramps 18a, 20a and the keepers 18c, 20c). While this is happening, the ramped or angled surfaces 12e of the guide elements 12g of the plates move along the lateral expansion ramps 18b, 20b to laterally move the plates in a lateral direction (that is transverse to the vertical direction) while the lateral keepers 18d, 20d move along the channels 12c (i.e., while the lateral guide element 12g moves along the space or channel between the opposing surfaces of the ramps 18b, 20b and the keepers 18d, 20d). And while this is happening, the extending portions 22a, 26a move within and relative to the receiving portions 24a, 28a, thereby allowing for vertical expansion or separation of the plates while maintaining the plates laterally aligned so that the plates of each set of plates laterally move together. The vertical keepers 18c, 20c are sufficiently wide so that, when the plates are laterally expanded or moved outward from the base assembly, a portion of the vertical keepers remain within the channels 12b and the vertical guide elements 12f remain within the spaces or channels between the opposing surfaces of the ramps 18a, 20a and the keepers 18c, 20c. Similarly, the lateral keepers 18d, 20d are sufficiently wide so that, when the plates are vertically expanded or moved upward/downward from the base assembly, a portion of the lateral keepers remain within the channels 12c and the lateral guide elements 12g remain within the spaces or channels between the opposing surfaces of the ramps 18b, 20b and the keepers 18d, 20d. When the base assembly is contracted (via rotational driving of the shaft in the opposite direction), the keepers 18c, 20c, 18d, 20d function to draw the plates back toward the central axis of the base assembly, while the extending portions 22a, 26a move within and relative to the receiving portions 24a, 28a to retract or contract the device in a controlled manner.

Thus, during expansion and contraction of the device, the four plates move vertically and laterally relative to the base assembly and relative to one another in a controlled manner via the engagement of the ramped surfaces and keepers of the base assembly with the channels and ramped surfaces of the respective plates, while the plates themselves interact to move laterally together while moving vertically apart.

Although shown and described as having an integral ratchet tab or arm or element 34, the cage may have a spring element that engages the toothed end of the shaft to allow for rotation of the shaft (relative to the end portions) in one direction and limit or preclude rotation of the shaft in the opposite direction. For example, and as shown in FIGS. 12-16, an expandable and contractible vertebral cage or device 110 includes end portions 118, 120 with a threaded shaft portion 116 having teeth or protrusions at the head 116a of the shaft 116. FIGS. 23-32 show another expandable and contractible vertebral cage or device 110', shown with the similar or common components referenced with like reference numbers as used in FIGS. 12-22. The end portion 118 includes a recess or channel 136 that receives a spring element 134, which has a tooth or projection that engages the toothed head 116a of the shaft.

Figure 14:
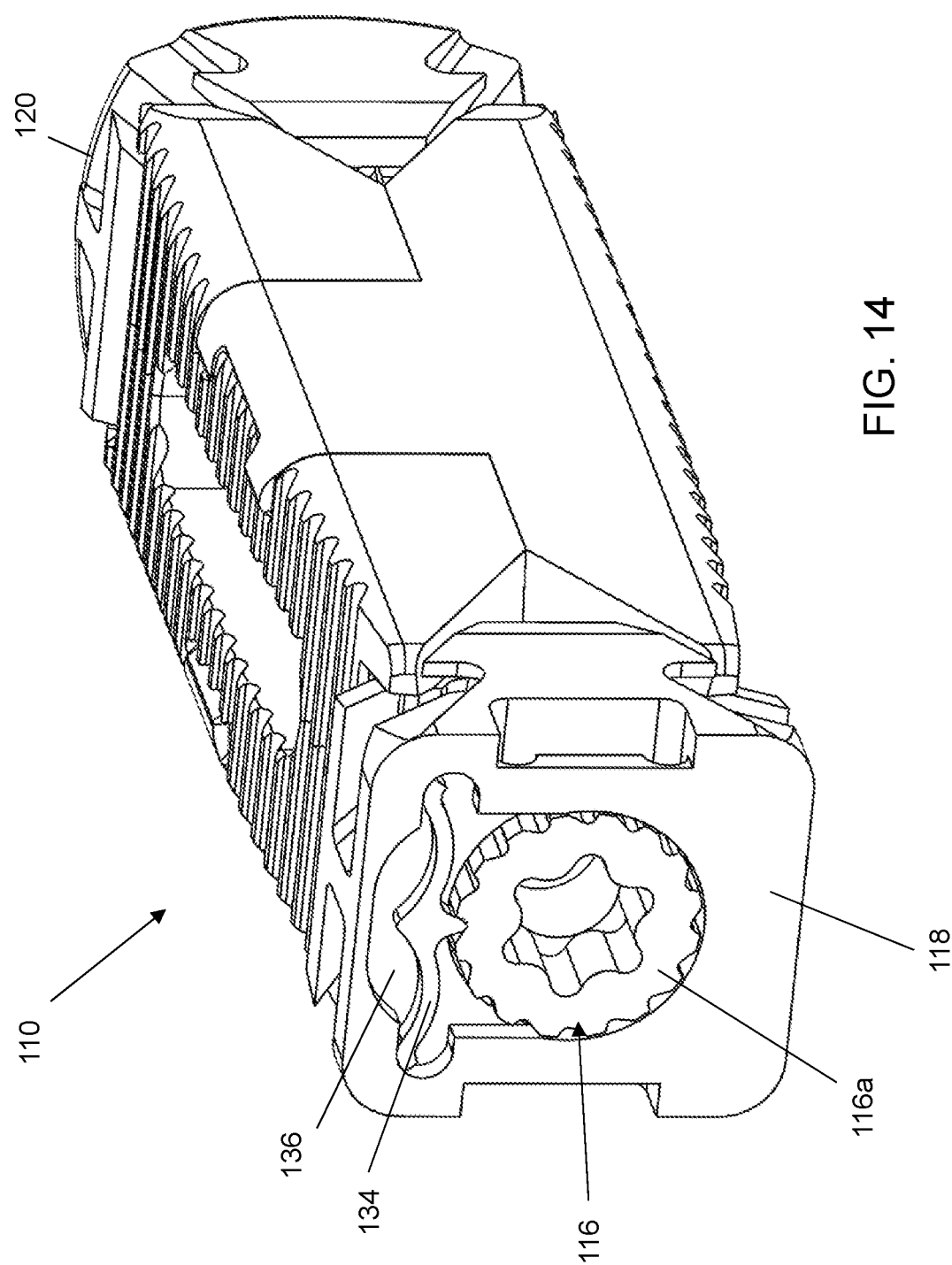
FIG. 14 is another perspective view of the device of FIG. 12, with an end of the end portion removed to show additional details.
Figure 15:
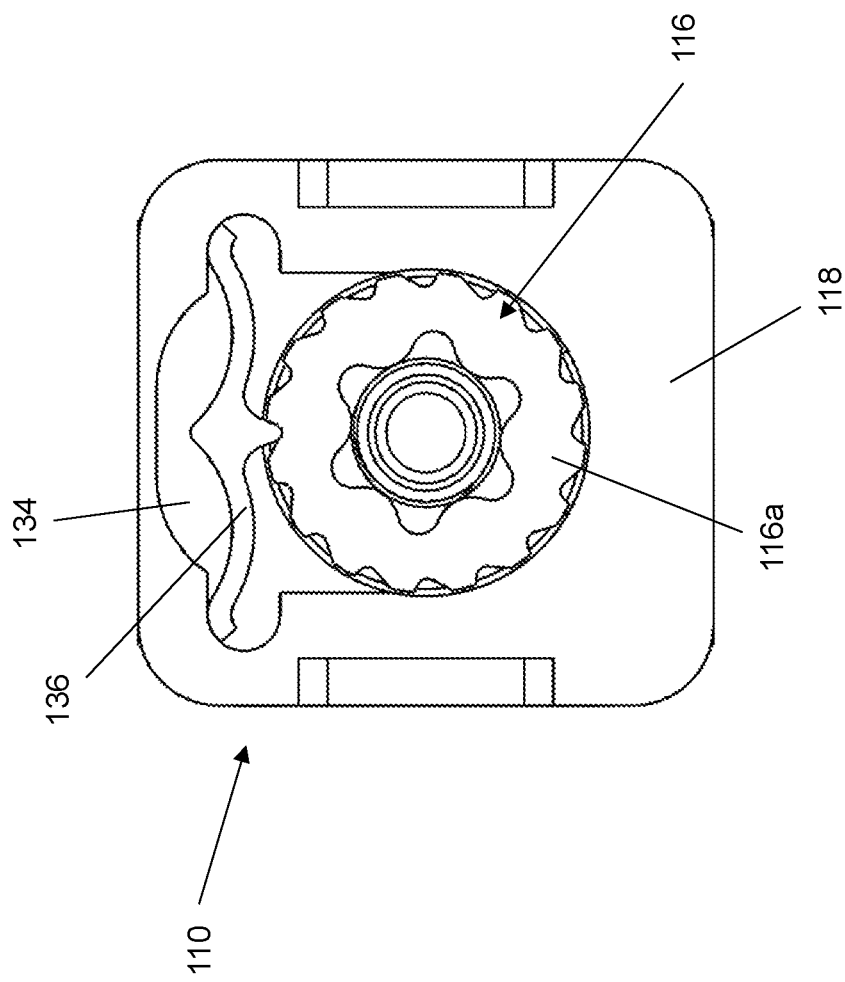
FIG. 15 is an end elevation of the device of FIG. 14.
Figure 16:
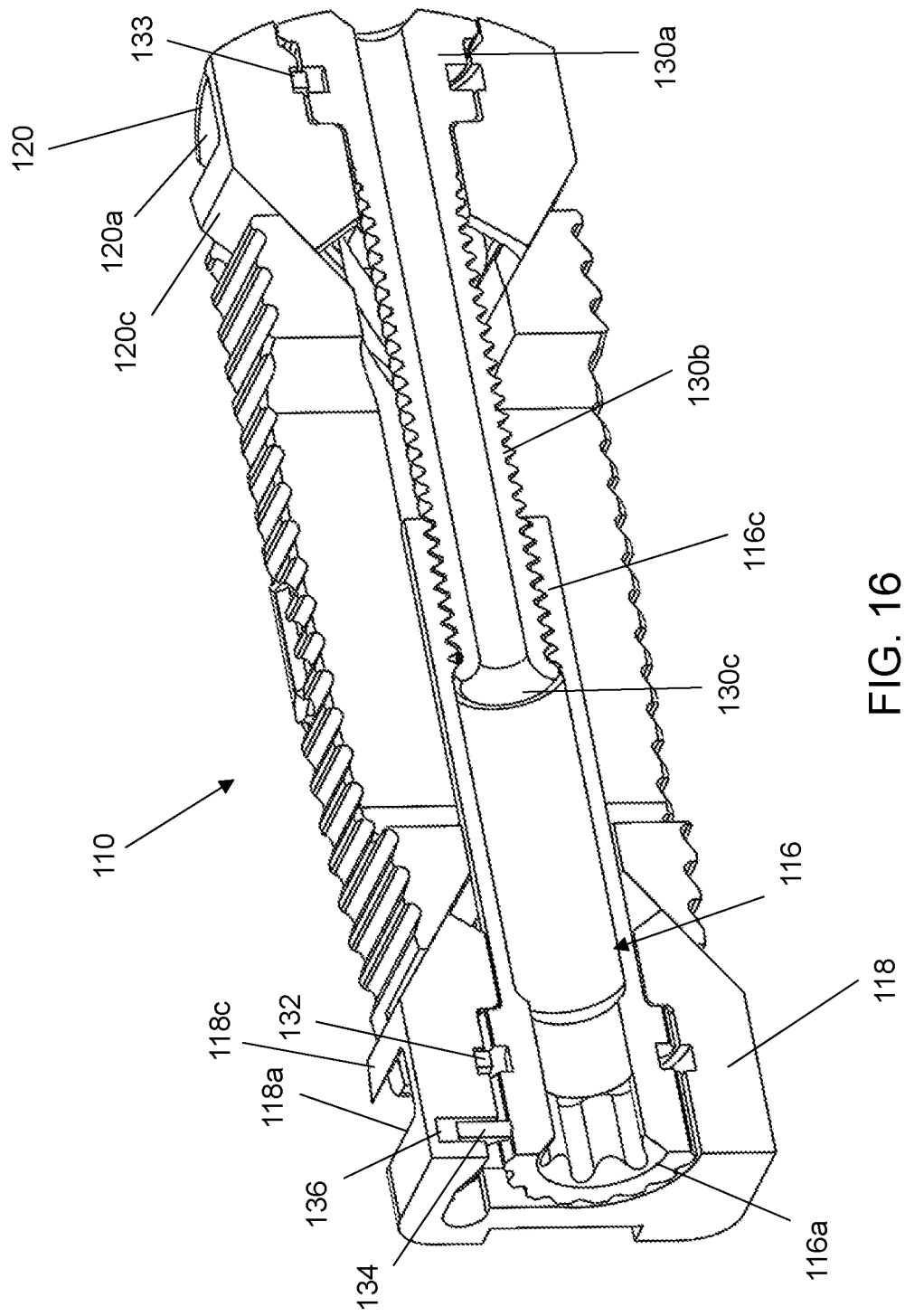
FIG. 16 is a perspective and sectional view of the device of FIG. 12.
Figure 17:
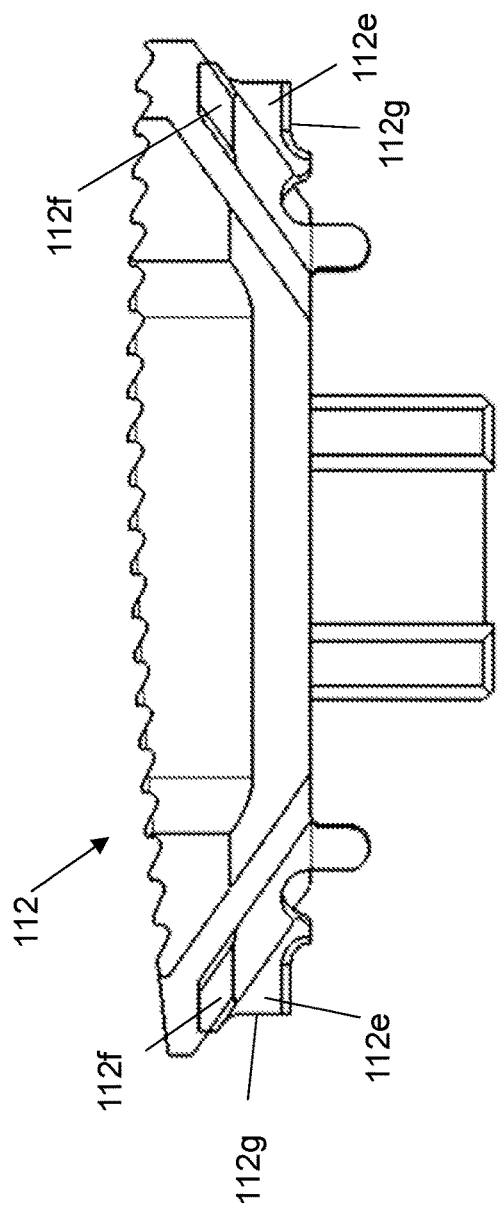
FIG. 17 is a side view of one of the plates of the device.
Figure 18:
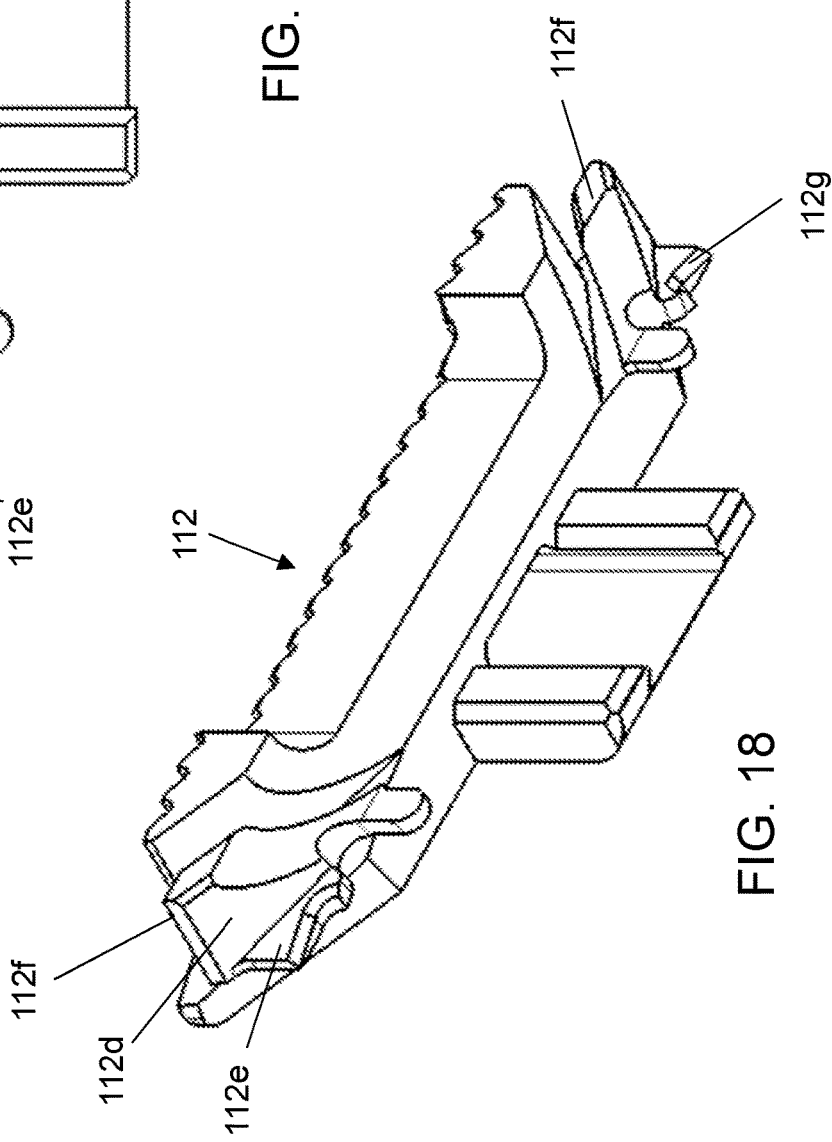
FIG. 18 is a perspective view of the plate of FIG. 17.
Figure 22:
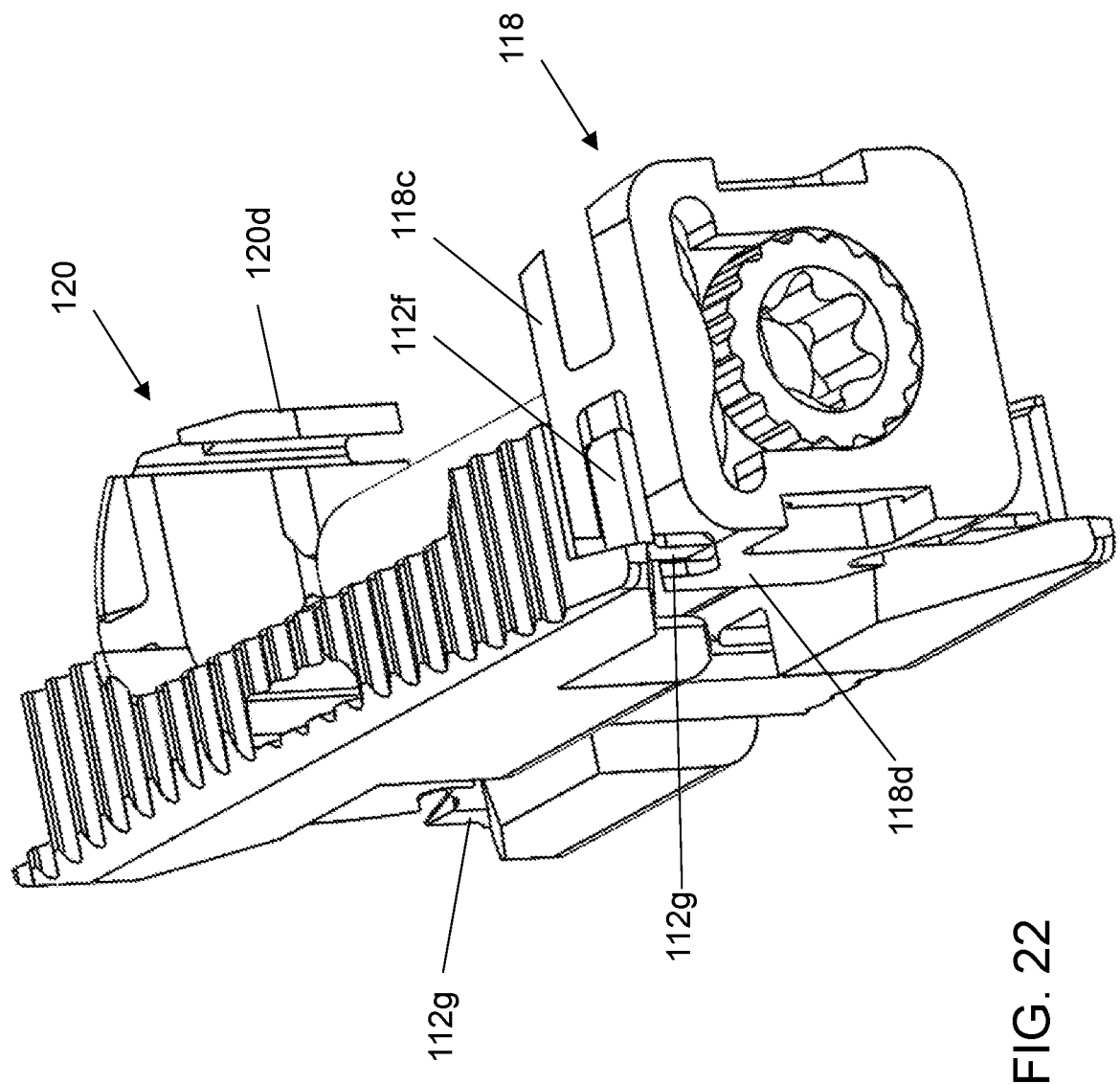
FIG. 22 is a perspective view of the device with some of the plates removed to show additional details.
Figure 23:
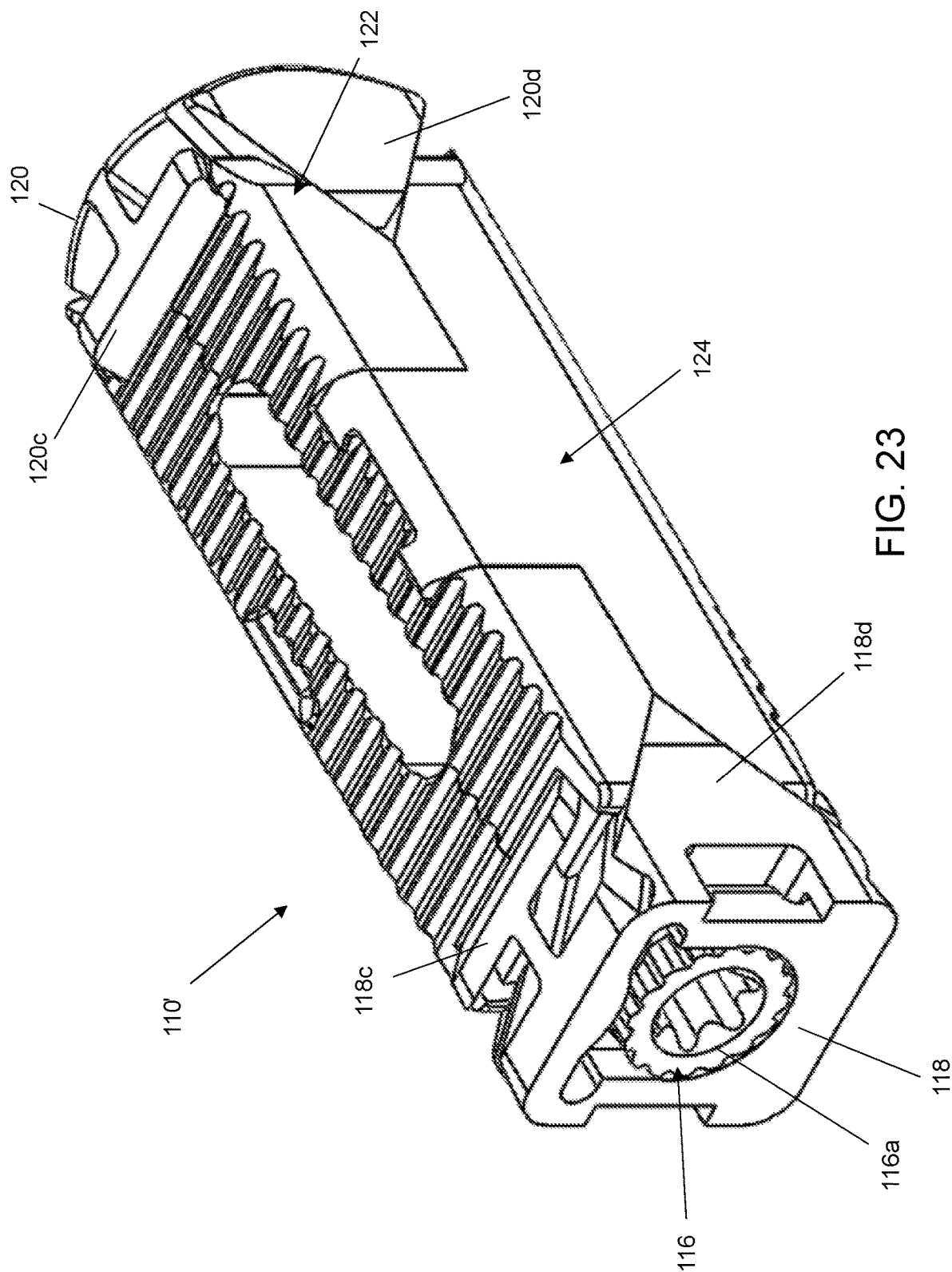
FIG. 23 is another perspective view of the vertically and laterally expandable and contractible cage or device, shown in the contracted state.
Figure 24:
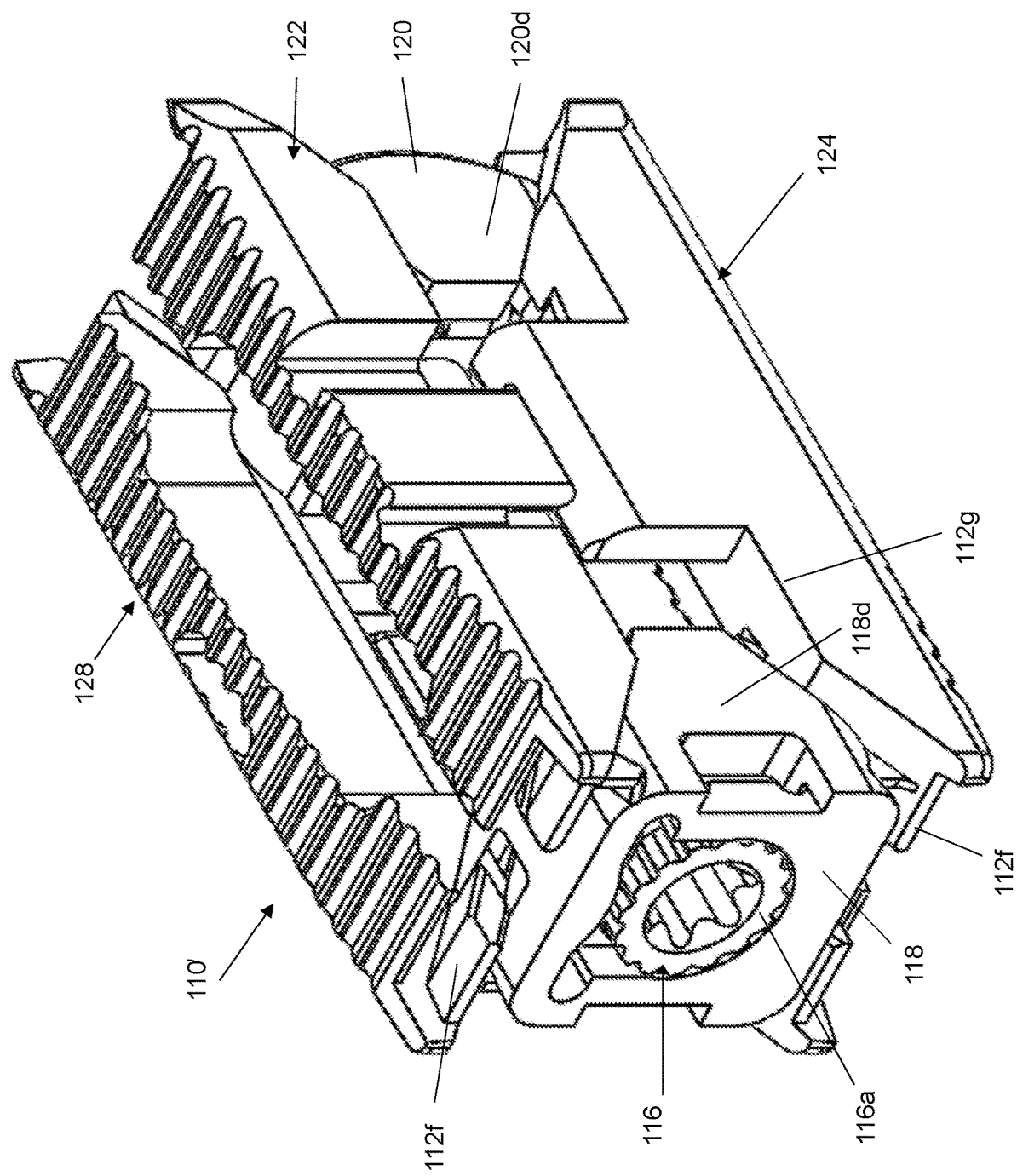
FIG. 24 is another perspective view of the vertically and laterally expandable and contractible cage or device, shown in the expanded state.
Figure 25:
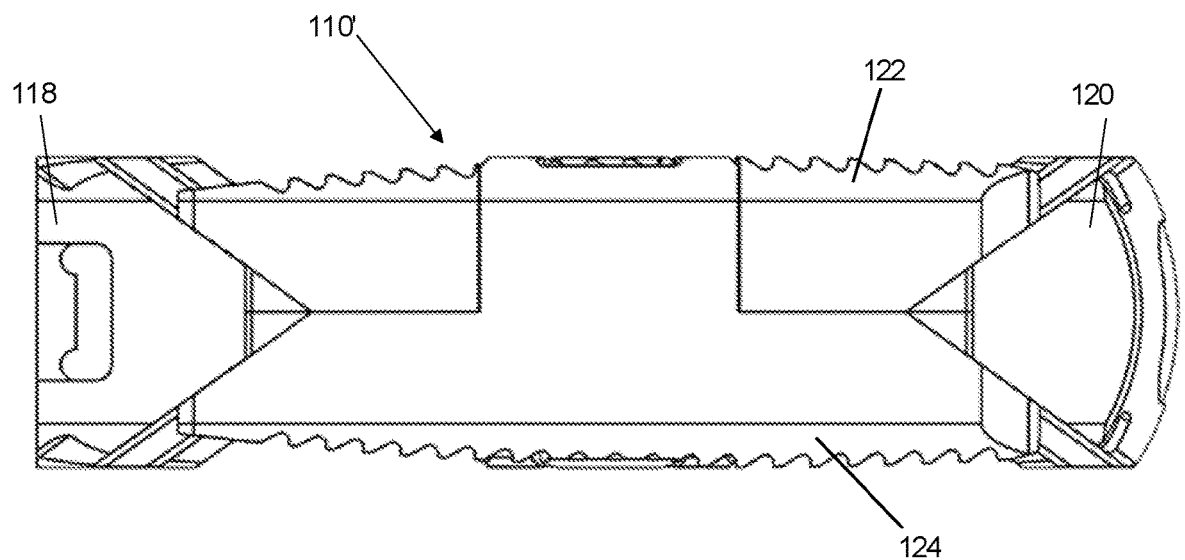
FIG. 25 is a side elevation of the contracted device of FIG. 23.
Figure 26:
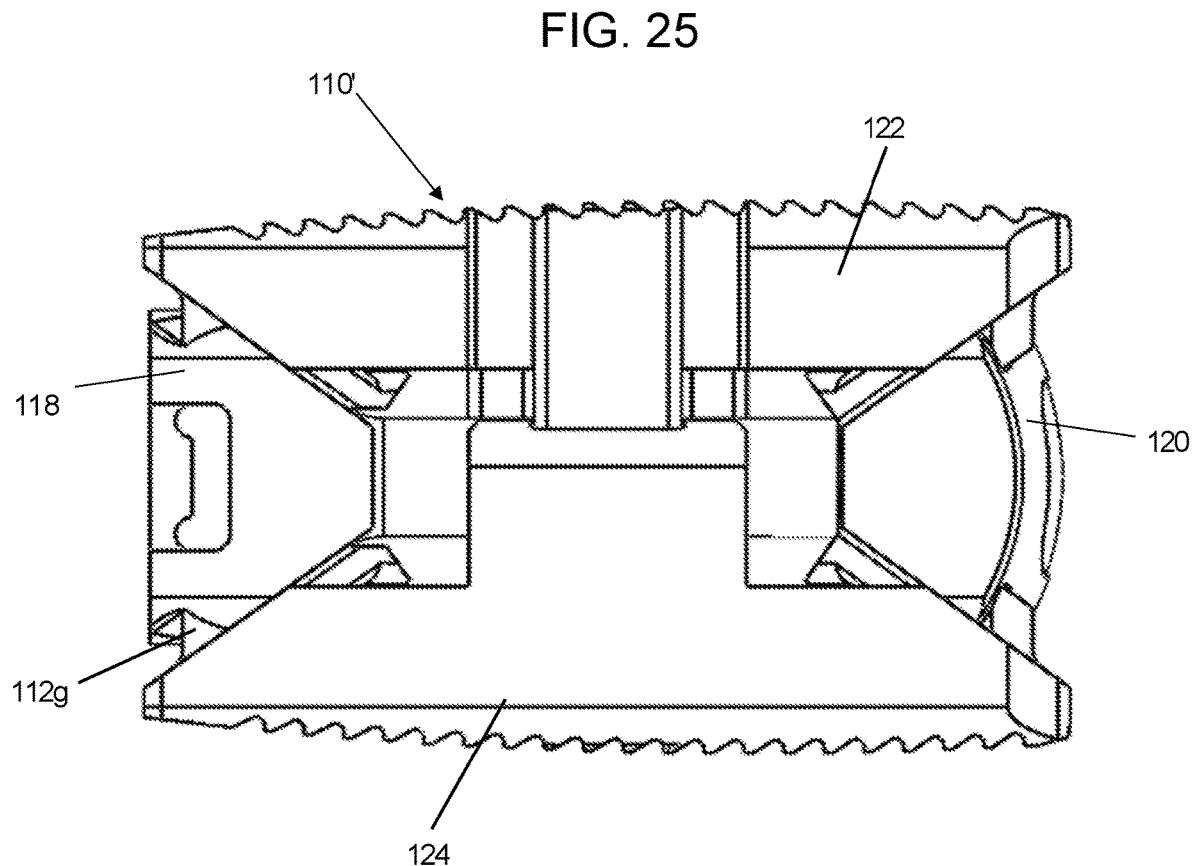
FIG. 26 is a side elevation of the expanded device of FIG. 24.
Figure 31:
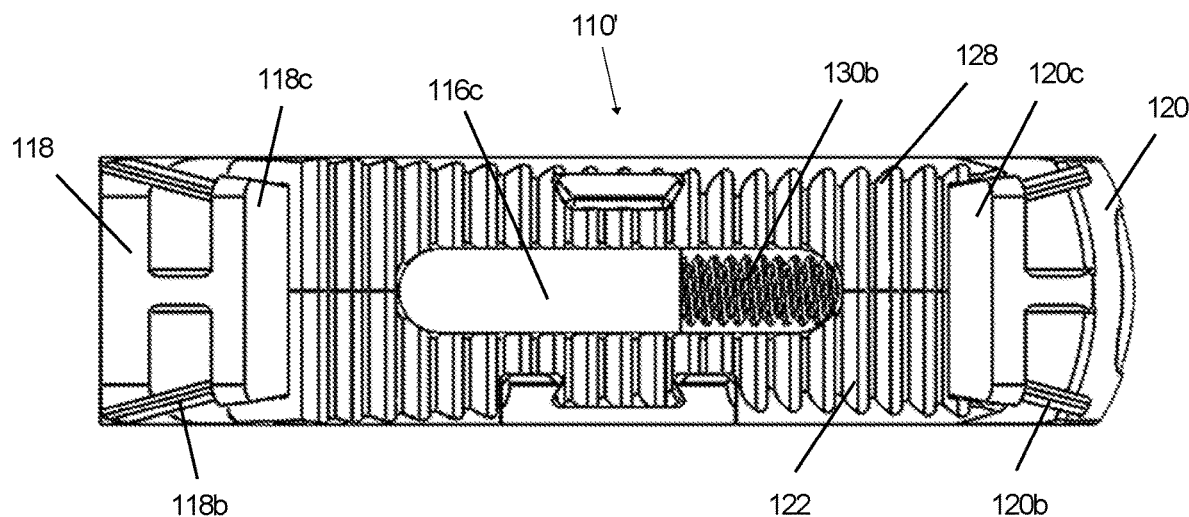
FIG. 31 is a top plan view of the contracted device of FIG. 23.
Figure 32:
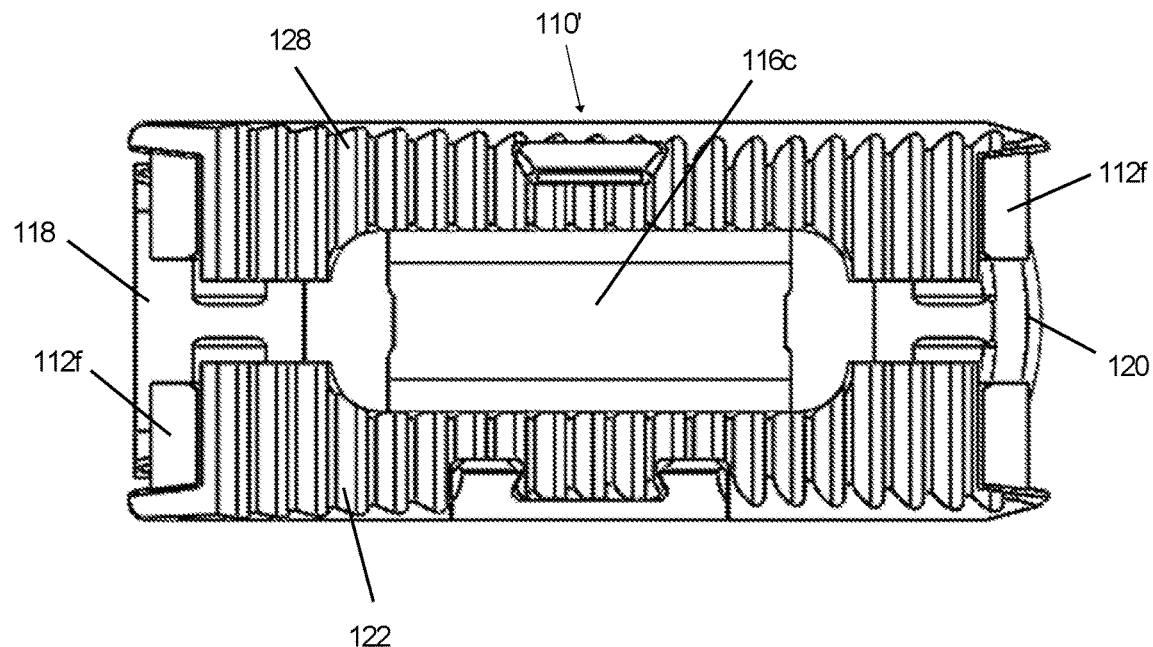
FIG. 32 is a top plan view of the expanded device of FIG. 24.
Figure 36:
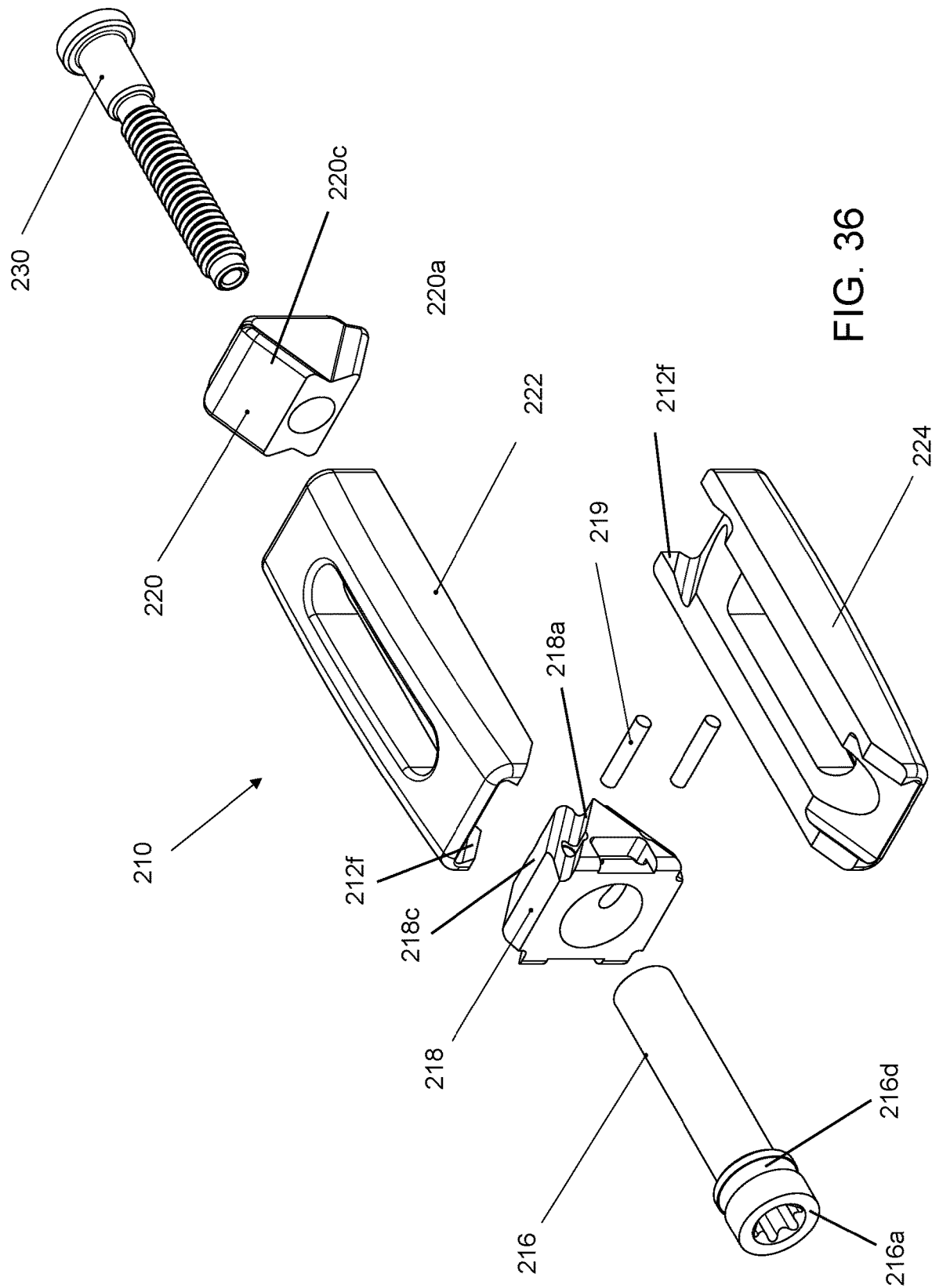
FIG. 36 is an exploded perspective view of the vertically expandable cage of FIG. 33.
Figure 37:
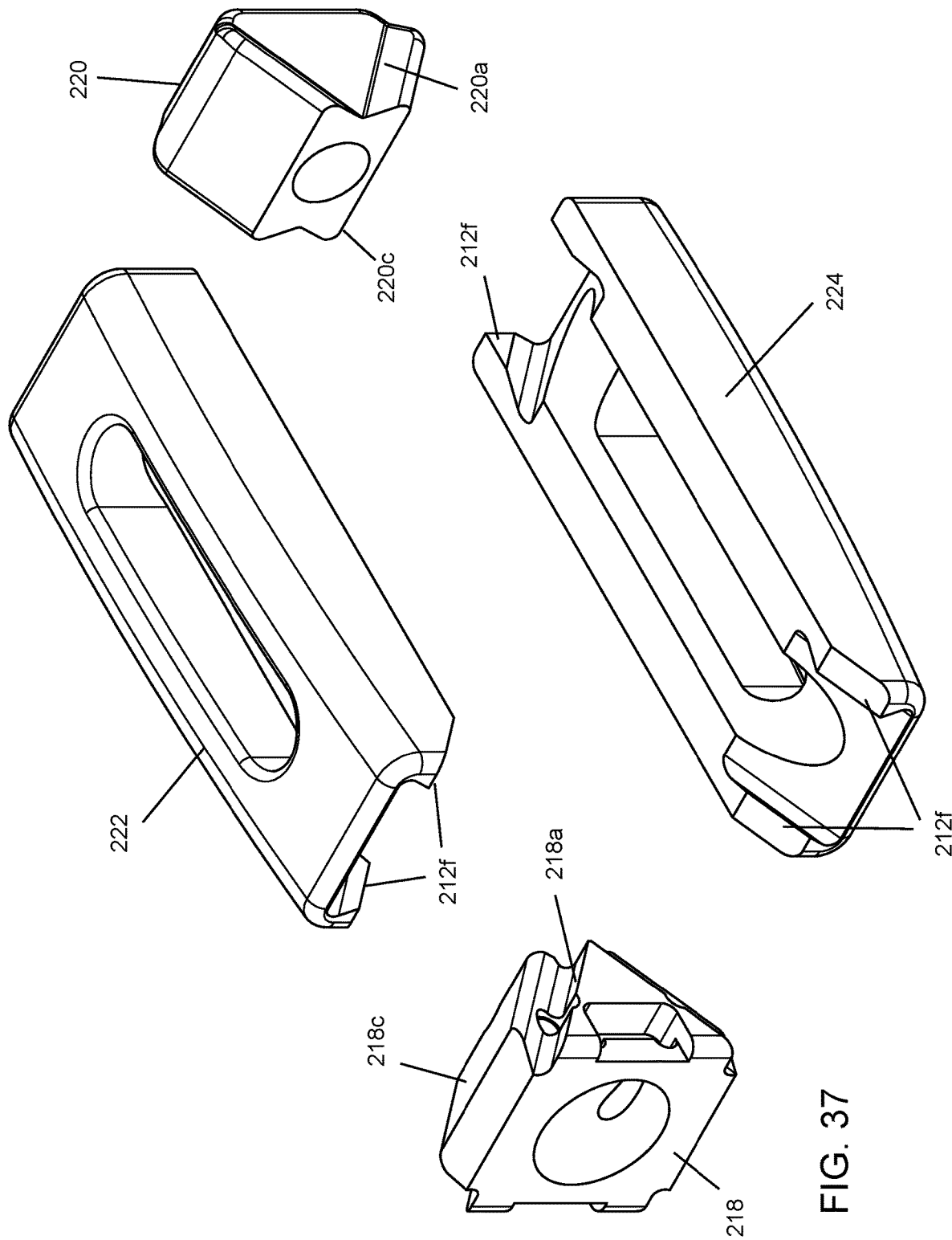
FIG. 37 is another exploded perspective view of portions of the vertically expandable cage of FIG. 33, with other portions removed.

As best seen with reference to FIGS. 14-16, the recess of the end portion 118 maintains the spring element in position at the head 116a and allows for radial (upward in FIGS. 14-16) movement of a center region of the spring element 134, which allows the tooth or projection of the spring element to move along the ramped toothed surface of the head 116a of the shaft portion 116 when the shaft portion is rotated in one direction (such as in the clockwise direction in FIG. 15) to allow for ratcheting expansion of the cage. Due to the shape of the teeth of the head 116a, the spring element does not radially move when the shaft portion is attempted to rotate in the opposite direction, such that the spring element limits or precludes rotation of the shaft in the opposite direction (to limit collapsing of the cage). The spring element thus avoids any unintentional backing out of the shaft or loosening or contracting of the cage, but may allow for rotation of the head of the shaft in the opposite direction (to collapse the cage) when sufficient torque is applied to the head of the shaft. The spring element 134 may comprise any suitable spring material that allows for flexing or deflection and that is biased towards its initial state.

The expandable and contractible vertebral cage or device 110 is similar to the device 10, discussed above, and includes the opposite end portions 118, 120 and a plurality of plates 112, including upper plates 122, 128 and lower plates 124, 126, that are movably disposed at the end portions 118, 120 and movable between the contracted state (see FIG. 12) and the expanded state (see FIG. 13) via movement of the end portions away from one another or toward one another. During such movement, the vertical guide element or member 112f of each of the upper and lower plates moves along the upper and lower ramped surfaces 118a, 120a of the end portions and between the ramped surfaces 118a, 120a and the opposing surfaces of the respective upper and lower keepers 118c, 120c, such as in a similar manner as discussed above with respect to the device 10. Similarly, during expansion or contraction, the lateral guide element 112g (FIGS. 13, 17 and 18) of each of the upper and lower plates moves along the side ramped surfaces 118b, 120b of the end portions and between the ramped surfaces 118b, 120b and the opposing surfaces of the respective side keepers 118d, 120d, such as in a similar manner as discussed above with respect to the device 10. During such expansion and contraction, the upper plate 122, 128 and its respective or corresponding lower plate 124, 126 move laterally together via the ramped surface engagements and via the vertical guides 122a, 124a and 126a, 128a, such as in a similar manner as discussed above with respect to the device 10.

Thus, when the end portions are moved toward one another to expand the cage, the upper and lower ramped surfaces 118a, 120a of the end portions and the correspondingly ramped outer surfaces of the vertical or upper and lower keepers 118c, 120c engage ramped surfaces of the vertical guide elements 112f and of the plate bodies (e.g., the ramped surface 118a engages and moves along the ramped surface 112d of the vertical guide element 112f) to cause the plates to move vertically outward (upward and downward), while the side ramped surfaces 118b, 120b of the end portions engage the inner ramped surfaces 112e of the lateral guide elements 112g to cause the plates to move laterally outward. Similarly, when the end portions are moved away from one another to contract the cage, the ramped inner surfaces of the vertical or upper and lower keepers 118c, 120c (the surfaces that oppose and are spaced from the ramped surfaces of the end portion) engage the inner ramped surfaces of the vertical guide elements 112f (the surfaces that oppose and are spaced from the ramped surface of the plate body) to cause the plates to move vertically inward (downward and upward), while the inner surfaces of the side keepers 118d, 120d (the surfaces that oppose and are spaced from the side ramped surfaces 118b, 120b of the end portions) engage the outer ramped surfaces of the lateral guide elements 112g to cause the plates to move laterally inward.

The end portions 118, 120 are movable relative to one another via the rotatable drive shaft 116 being rotatably disposed at the first end portion 118 of the base assembly (and retained thereat and longitudinally restrained via a lock ring 132 that is disposed at a circumferential channel or groove formed in the longitudinal passageway of the end portion and at a circumferential channel or groove formed around the head of the shaft, such as shown in FIG. 16) and rotatably engaging or threadedly engaging a threaded shaft 130 at the second end portion 120 of the base assembly. When the shaft 116 is rotated in one direction, the end portions or wedges 118, 120 of the base assembly are drawn toward one another, which causes the plates 122, 124, 126, 128 to move outward away from the central or longitudinal axis of the base assembly, and when the shaft is rotated in the opposite direction, the end portions 118, 120 of the base assembly are moved away from one another, which causes the plates to move inward and toward the central or longitudinal axis of the base assembly, as also discussed below.

As best shown in FIG. 16, the shaft 116 is received through an aperture in the proximal end portion 118 and that threadedly engages the threaded shaft 130, which is received through an aperture through the distal end portion 120 and retained at the end portion via a lock ring 133. The shaft 116 is rotatably disposed in the proximal end portion 118 and longitudinally retained therein via the lock ring or C-ring 132 (which is disposed at the head 116a of the shaft 116 and is received at a groove at the head of the shaft and in a groove at the passageway or aperture of the proximal end portion 118 to retain the shaft in place at the proximal end portion while allowing for rotation of the shaft relative to the proximal end portion). The other shaft 130 is disposed in the distal end portion 120 and longitudinally retained therein via the lock ring or C-ring 133 (which is disposed at the head or end 130a of the shaft 130 and is received at a groove at the end of the shaft and in a groove at the passageway or aperture of the distal end portion 120 to retain the shaft in place at the distal end portion and to limit rotation of the shaft relative to the distal end portion). Optionally, and such as shown in FIGS. 28 and 30, the head or end 130a' of the shaft may be non-circular and received at the end of the end portion 120 so as to be non-rotatably disposed at the end portion (or optionally the shaft may be integrally formed with the end portion).

The shaft 116 comprises a hollow shaft having internal threads for engaging the external threads of the threaded portion 130b of the shaft 130. The threaded end of the shaft 130 is threaded into the threaded hollow end of the shaft 116, such that rotation of the shaft 116 causes movement of the shaft 116 along the shaft 130 and causes movement of the distal end portion relative to the proximal end portion to cause expansion and contraction of the cage or device. As can be seen in FIG. 16, the internal threads 116c of the shaft 116 terminate a selected distance from the end of the shaft, with the rest of the hollow shaft 116 being non-threaded. The threaded portion 130b of the shaft 130 is threaded into the hollow shaft 116, and the end 130c of the shaft 130 is flared radially outwardly to provide a larger diameter, non-threaded end of the shaft 130. The flared end 130c functions to limit or preclude separation of the shaft 116 from the shaft 130 because the flared end cannot be threaded along the internal threads 116c of the shaft 116. Thus, the flared end 130c limits separation movement of the shafts and end portions when the device is contracted to avoid disassembly of the device. The flaring of the end of the shaft 130 is performed after the shafts are assembled together, such as via a flaring mandrel inserted through the head 116a of the shaft 116 and into engagement with the end of the shaft 130.

Thus, the cage provides for expansion of a plurality of plates in the vertical and/or lateral directions via engagement of ramped surfaces of the end portions and the plates. For example, the end portion or the plate may comprise a ramped or angled element having one or more ramped or angled surfaces that engage one or more ramped or angled surfaces of the other of the end portion or the plate, so that, when the end portion moves relative to the plates (such as when the end portions are drawn toward one another), the interaction of the ramped or angled surfaces causes the plates to move laterally and vertically outward to expand the cage. Contraction of the plates may be achieved via interaction between another ramped or angled element/surface of the end portion and another ramped or angled element/surface of the plate(s). Optionally, the cage may provide for only expansion via the interaction of corresponding ramped or angled surfaces (as the end portions are drawn toward one another), while contraction of the cage may be provided via any other suitable means. The end portion thus may include angled or ramped surfaces that engage corresponding angled or ramped surfaces of the plates to expand the cage vertically and laterally as the end portions are moved along the plates.

The guide elements and guide channels are formed to provide the desired degree of vertical expansion and lateral expansion of the plates and of the cage. The guide elements and guide channels are formed at respective angles relative to the longitudinal axis of the end portions and of the expansion mechanism. For example, the greater the angle of the vertical channels and vertical guide elements relative to the longitudinal axis, the greater the degree of vertical movement of the plates as the end portions are moved relative to one another. Likewise, the greater the angle of the lateral channels and lateral guide elements relative to the longitudinal axis, the greater the degree of lateral movement of the plates as the end portions are moved relative to one another.

Optionally, the lateral channels and lateral guide elements may be formed to be generally parallel to the longitudinal axis of the expansion mechanism, whereby the plates may only move vertically relative to the end portions as the vertical guide elements move along the vertical channels (and as the lateral guide elements move along the lateral channels). In such a configuration, the upper plates may be joined together or formed as a single upper plate and the lower plates may be joined together or formed as a single lower plate.

Thus, for example, the vertical guide elements and vertical guide channels may be formed at an angle relative to the longitudinal axis of the expansion mechanism that is greater than zero degrees, such as greater than about 15 degrees and less than about 45 degrees, such as around 30 degrees or thereabouts. The lateral guide elements and lateral guide channels may be formed at any suitable angle depending on the degree of lateral expansion of the cage that is desired for the particular cage application. For example, the lateral guide elements and lateral guide channels may be formed at an angle relative to the longitudinal axis of the expansion mechanism that is zero degrees (for a vertical expansion only cage configuration) or at an angle relative to the longitudinal axis of the expansion mechanism that is greater than zero degrees, such as greater than about 5 degrees and less than about 30 degrees, such as around 15 degrees or thereabouts (with the degree of lateral expansion being less than the degree of vertical expansion).

Optionally, the expandable and contractible cage may provide for vertical expansion via vertical guide elements of the upper and lower plates moving along angled or ramped channels of the end portions, with no lateral guide elements or lateral guide channels. For example, and with reference to FIGS. 33-37, a vertically expandable and contractible cage 210 includes end portions 218, 220 that move relative to one another via a threaded shaft 216 at the end portion 218 threadedly engaging another threaded shaft at the end portion 220, whereby movement of the end portions imparts vertical movement of an upper plate 222 and a lower plate 224. Similar to the cages 10, 110, 110' discussed above, the end portions 218, 220 include upper and lower ramped surfaces 218a, 220a and upper and lower keepers 218c, 220c (which form channels at each side of the keepers and between the ramped surfaces 218a, 220a and the opposing surfaces of the respective upper and lower keepers 218c, 220c. The end plates 222, 224 include a pair of guide elements 212f that are received in and that move along the channels at each side of the keepers and between the ramped surfaces 218a, 220a and the opposing surfaces of the respective upper and lower keepers 218c, 220c to move the end plates vertically apart when the end portions 218, 220 are moved toward one another.

The end portions 218, 220 are disposed at respective threaded shafts 216, 230, with the threaded shaft 230 threading into the threaded receiver or shaft 216, such that rotation of the threaded shaft 216 causes the end portions to move toward or away from one another, such as in a similar manner as described above. The threaded shaft 230 is fixedly disposed at the end portion 220, while the threaded shaft 216 (having the drivable head 216a) is rotatably disposed at and through the end portion 218. In the illustrated embodiment, the end portion 218 includes a pair of passageways that are formed laterally or cross-wise through the end portion and that intersect the longitudinal passageway that receives the shaft 216. The shaft is inserted into the longitudinal passageway until a circumferential channel or groove 216d formed around the head of the shaft 216 is positioned at the passageways, whereby a pair of retaining pins 219 are inserted into the lateral passageways and partially received in the groove 216d to longitudinally retain the shaft 216 at the end portion 218, while allowing for rotation of the shaft 216 within the end portion 218. The length of the pins is selected so that the pins, when inserted into the lateral passageways, do not protrude into the channel formed between the ramped surfaces 218a, 220a and the opposing surfaces of the respective upper and lower keepers 218c, 220c.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The invention claimed is:

1. An expandable vertebral device comprising:
  a base assembly comprising a first end portion and a second end portion that are movable relative to one another via adjustment of an adjustment mechanism at the first end portion, each of the first and second end portions having opposed upper and lower sides;
  a plurality of vertical keepers, each vertical keeper extending from an upper or lower side of one of the first or second end portions;
  a plurality of vertical guide channels, each vertical guide channel defined between an outer ramped surface of one of the upper or lower sides and an inner ramped surface of the respective vertical keeper, the outer ramped surface and the inner ramped surface are substantially parallel to each other;

a plurality of movable plates movably disposed at the base assembly and at least vertically movable relative to the base assembly as the first and second end portions are moved relative to one another;

wherein each plate of the plurality of movable plates comprises at least one vertical guide element at each end of the plate, and wherein each vertical guide element is movably received in a respective one of the vertical guide channels of a respective one of the first and second end portions;

wherein each end portion further includes a lateral guide channel at each of the laterally opposite sides of the respective end portion, and each plate of the plurality of movable plates includes a lateral guide element at each end of the plate, and each lateral guide element is movably received in a respective one of the lateral guide channels of a respective one of the first and second end portions; and wherein, when the adjustment mechanism is adjusted to draw the first and second end portions toward one another, the movable plates move at least vertically outward from a longitudinal axis of the base assembly as the vertical guide elements move along the respective vertical guide channels.

2. The expandable vertebral device of claim 1, wherein the lateral guide channels extend substantially parallel to the longitudinal axis of the base assembly such that the movable plates move vertically outward from the longitudinal axis of the base assembly as the vertical guide elements move along the respective vertical guide channels and as the lateral guide elements move along the respective lateral guide channels.

3. The expandable vertebral device of claim 2, wherein the plurality of movable plates comprises an upper plate and a lower plate.

4. The expandable vertebral device of claim 1, wherein the lateral guide channel is defined between an outer laterally ramped surface of the body portion of the respective first end portion or second end portion and an inner ramped surface of a lateral keeper element that protrudes from the body portion of the respective first end portion or second end portion.

5. The expandable vertebral device of claim 4, wherein, when the adjustment mechanism is adjusted to draw the first and second end portions toward one another, the inner ramped surface of the vertical keeper element moves along an outer surface of the vertical guide element and the inner ramped surface of the lateral keeper element moves along an outer surface of the lateral guide element.

6. The expandable vertebral device of claim 5, wherein, when the adjustment mechanism is adjusted to move the first and second end portions away from one another, the outer vertically ramped surface of the body portion moves along an inner surface of the vertical guide element and the outer laterally ramped surface of the body portion moves along an inner surface of the lateral guide element.

7. The expandable vertebral device of claim 1, wherein the lateral guide channels are angled relative to the longitudinal axis of the base assembly such that the movable plates move vertically and laterally outward from the longitudinal axis of the base assembly as the vertical guide elements move along the respective vertical guide channels and as the lateral guide elements move along the respective lateral guide channels.

8. The expandable vertebral device of claim 7, wherein the plurality of movable plates comprise a first set of plates and a second set of plates, with each set of plates comprising an upper plate and a lower plate that laterally move apart while vertically moving apart when the adjustment mechanism is adjusted to draw the first and second end portions toward one another.

9. The expandable vertebral device of claim 8, wherein the respective upper plate is movably joined with the respective lower plate via vertical joining elements that maintain the upper and lower plates of each of the first and second sets of plates laterally aligned while allowing for relative vertical movement of the upper and lower plates.

10. The expandable vertebral device of claim 7, wherein the plurality of movable plates comprises a first upper plate, a second upper plate, a first lower plate and a second lower plate.

11. The expandable vertebral device of claim 10, wherein the vertical guide elements at each end of the first and second upper plates are movably received in the vertical guide channels at the upper side of the respective one of the first and second end portions, and wherein the vertical guide elements at each end of the first and second lower plates are movably received in the vertical guide channels at the lower side of the respective one of the first and second end portions.

12. The expandable vertebral device of claim 11, wherein the lateral guide elements at each end of the first upper plate and the first lower plate are movably received in the lateral guide channel at a first lateral side of the respective one of the first and second end portions, and wherein the lateral guide elements at each end of the second upper plate and the second lower plate are movably received in the lateral guide channel at a second lateral side of the respective one of the first and second end portions.

13. The expandable vertebral device of claim 12, wherein the first upper plate is movably joined with the first lower plate via first vertical joining elements that maintain the first upper plate and the first lower plate laterally aligned while allowing for relative vertical movement of the first upper plate and the first lower plate, and wherein the second upper plate is movably joined with the second lower plate via second vertical joining elements that maintain the second upper plate and the second lower plate laterally aligned while allowing for relative vertical movement of the second upper plate and the second lower plate.

14. The expandable vertebral device of claim 7, wherein, when the adjustment mechanism is adjusted to move the first end portion away from the second end portion, the movable plates move inward toward the longitudinal axis of the base assembly via the vertical guide elements moving along the respective vertical guide channels and via the lateral guide elements moving along the respective lateral guide channels.

15. The expandable vertebral device of claim 1, wherein the adjustment mechanism comprises a threaded drive shaft that threadedly engages a threaded shaft at the second end portion, and wherein adjustment of the adjustment mechanism comprises rotatably driving the threaded drive shaft.

16. The expandable vertebral device of claim 15, wherein the threaded drive shaft comprises a hollow shaft having an internal threaded surface that threadedly engages an external threaded surface of the threaded shaft of the second end portion.

17. The expandable vertebral device of claim 16, wherein a terminal end of the threaded shaft of the second end portion is received at a non-threaded region of the hollow shaft and is flared outward to limit detachment of the threaded drive shaft and the threaded shaft of the second end portion.

18. The expandable vertebral device of claim 16, wherein the threaded shaft is disposed in and retained at an aperture through the second end portion.

19. The expandable vertebral device of claim 15, wherein the first end portion of the base assembly comprises a ratchet element that engages a toothed surface of the threaded drive shaft to allow for rotation in the direction that draws the first and second end portions toward one another and to limit rotation in the opposite direction.

20. The expandable vertebral device of claim 19, wherein the ratchet element comprises a spring element disposed in a recess of the first end portion, and wherein the recess provides clearance for movement of the spring element along the toothed surface as the threaded drive shaft is rotated in the direction that draws the first and second end portions toward one another.

21. An expandable vertebral device comprising:
a base assembly comprising first and second end portions that are movable relative to one another via adjustment of an adjustment mechanism at the first end portion;
a plurality of movable plates movably disposed at the base assembly and at least vertically movable relative to the base assembly as the first and second end portions are moved relative to one another;
wherein each of the first and second end portions comprises a pair of vertical keepers extending from opposing upper and lower sides of the respective end portion and a pair of lateral keepers at laterally opposite sides of the respective end portion;
wherein each of the plurality of movable plates comprises (i) a vertical guide element that is movable relative to one of the vertical keepers and (ii) a lateral guide element that is movable relative to one of the lateral keepers;
wherein the vertical keepers at the upper and lower sides of the respective end portion define vertical guide channels between an inner ramped surface of the respective vertical keeper and an outer ramped surface of the respective upper or lower side of the respective end portion, the vertical guide channels receive respective vertical guide elements therein, the inner ramped surface and the outer ramped surface oppose one another and are spaced apart from one another in a substantially parallel arrangement; and
wherein, when the adjustment mechanism is adjusted to draw the first and second end portions toward one another, the movable plates move at least vertically outward from a longitudinal axis of the base assembly as the guide elements move along the respective guide channels.

22. The expandable vertebral device of claim 21, wherein the plurality of movable plates comprises a first set of plates and a second set of plates, with each set of plates comprising an upper plate and a lower plate that laterally move apart while vertically moving apart when the adjustment mechanism is adjusted to draw the first and second end portions toward one another.

23. The expandable vertebral device of claim 22, wherein the upper plate is movably joined with the lower plate via vertical joining elements that maintain the upper and lower plates laterally aligned while allowing for relative vertical movement of the upper and lower plates.

24. The expandable vertebral device of claim 21, wherein, when the adjustment mechanism is adjusted to move the first end portion away from the second end portion, the movable plates move inward toward the longitudinal axis of the base assembly via the guide elements moving along the respective guide channels.

25. The expandable vertebral device of claim 21, wherein the lateral keepers define lateral guide channels between an inner ramped surface of the respective lateral keeper and an outer ramped surface of the respective lateral side of the respective end portion, the lateral guide channels receive respective lateral guide elements therein, the inner ramped surface of the respective lateral keeper and the outer ramped surface of the respective lateral side of the respective end portion oppose one another and are spaced apart from one another in a substantially parallel arrangement.

26. The expandable vertebral device of claim 21, wherein the adjustment mechanism comprises a threaded drive shaft that threadedly engages a threaded shaft at the second end portion, and wherein adjustment of the adjustment mechanism comprises rotatably driving the threaded drive shaft.

27. The expandable vertebral device of claim 26, wherein the threaded drive shaft comprises a hollow shaft having an internal threaded surface that threadedly engages an external threaded surface of the threaded shaft of the second end portion.

28. The expandable vertebral device of claim 26, wherein the first end portion of the base assembly comprises a ratchet element that engages a toothed surface of the threaded drive shaft to allow for rotation in the direction that draws the first and second end portions toward one another and to limit rotation in the opposite direction.

* * * * *